US012217903B2

(12) United States Patent
Guo et al.

(10) Patent No.: US 12,217,903 B2
(45) Date of Patent: Feb. 4, 2025

(54) INTEGRATED TRANSFORMER AND ELECTRONIC DEVICE

(71) Applicants: SHENNAN CIRCUITS CO., LTD., Shenzhen (CN); RADIAL ELECTRONICS, El Dorado Hills, CA (US)

(72) Inventors: Weijing Guo, Shenzhen (CN); James Quilici, Shenzhen (CN); Yuhua Zeng, Shenzhen (CN); Hua Miao, Shenzhen (CN)

(73) Assignees: SHENNAN CIRCUITS CO., LTD., Shenzhen (CN); RADIAL ELECTRONICS, El Dorado Hills, CA (US)

( * ) Notice: Subject to any disclaimer, the term of this patent is extended or adjusted under 35 U.S.C. 154(b) by 826 days.

(21) Appl. No.: 17/083,237

(22) Filed: Oct. 28, 2020

(65) Prior Publication Data

US 2021/0074471 A1 Mar. 11, 2021

Related U.S. Application Data

(63) Continuation of application No. PCT/CN2018/087823, filed on May 22, 2018.

(30) Foreign Application Priority Data

Apr. 29, 2018 (CN) ........................ 201810405238.0

(51) Int. Cl.
*H01F 27/28* (2006.01)
*H01F 27/00* (2006.01)
(Continued)

(52) U.S. Cl.
CPC ......... *H01F 27/306* (2013.01); *H01F 27/006* (2013.01); *H01F 27/266* (2013.01);
(Continued)

(58) Field of Classification Search
CPC .... H01F 27/306; H01F 27/006; H01F 27/266; H01F 27/2866; H01F 27/29; H01F 27/40; H01F 27/24; H01F 27/2804
See application file for complete search history.

(56) References Cited

U.S. PATENT DOCUMENTS

2005/0212642 A1* 9/2005 Pleskach ............ H01F 17/0033 336/200
2006/0152322 A1* 7/2006 Whittaker ............. H05K 3/429 336/200
(Continued)

FOREIGN PATENT DOCUMENTS

CN 201663036 U 12/2010
CN 102308346 A 1/2012
(Continued)

OTHER PUBLICATIONS

International Search report, PCT/CN2018/087823, mailed on Jan. 30, 2019.
(Continued)

*Primary Examiner* — Mang Tin Bik Lian

(57) ABSTRACT

An integrated transformer and an electronic device are provided. An integrated transformer includes at least one substrate defining a plurality of annular accommodating grooves. Each annular accommodating groove divides a corresponding substrate into a central part surrounded by the each annular accommodating groove and a peripheral part arranged around the each annular accommodating groove. The central parts and the peripheral parts, magnetic cores received in the annular accommodating grooves and conductive connectors assembled on the at least one substrate, and transmission wire layers on both sides of the at least one substrate cooperatively constitute a plurality of transformers and filters arranged according to preset arrangement manners. At least one of the transformers and at least one of the
(Continued)

filters are electrically connected to form a group of electromagnetic assemblies, and any two groups of electromagnetic assemblies are not electrically connected with each other on the at least one substrate.

20 Claims, 12 Drawing Sheets

(51) Int. Cl.

| | |
|---|---|
| ***H01F 27/26*** | (2006.01) |
| ***H01F 27/29*** | (2006.01) |
| ***H01F 27/30*** | (2006.01) |
| ***H01F 27/40*** | (2006.01) |

(52) U.S. Cl.
CPC ......... *H01F 27/2866* (2013.01); *H01F 27/29* (2013.01); *H01F 27/40* (2013.01)

(56) References Cited

U.S. PATENT DOCUMENTS

2007/0290783 A1* 12/2007 Whittaker ............. H01F 27/266 336/229
2010/0013589 A1* 1/2010 Schaffer ................ H01F 41/046 336/200
2010/0295646 A1* 11/2010 Harrison ................. H01F 19/04 336/200
2011/0272094 A1* 11/2011 Dalmia ................. H01F 41/042 156/293
2013/0141878 A1 6/2013 Wu et al.
2014/0043131 A1* 2/2014 Dalmia ................... H01F 5/003 336/200
2014/0116758 A1* 5/2014 Li .......................... H05K 1/165 174/255
2014/0169042 A1* 6/2014 Eguchi ................ H02M 3/3353 363/21.06
2014/0266549 A1* 9/2014 Huang ................. H05K 3/4602 336/200
2015/0101854 A1* 4/2015 Lee ....................... H01F 41/046 29/606
2016/0111196 A1* 4/2016 Francis ................ H05K 1/0298 336/200
2016/0111199 A1* 4/2016 Quilici .................... H01F 27/29 336/200
2016/0111965 A1* 4/2016 Wang ...................... H01F 19/06 363/21.04
2016/0254089 A1* 9/2016 Parish ................ H01F 27/2804 336/199
2016/0254091 A1* 9/2016 Harber .................. H01F 41/046 336/221

FOREIGN PATENT DOCUMENTS

CN 202134313 U 2/2012
CN 104425104 A 3/2015
CN 105529150 A 4/2016
CN 105529157 A 4/2016
CN 208141946 U 11/2018
CN 208141988 U 11/2018
CN 208637280 U 3/2019
JP 2012151311 A 8/2012
WO WO205069318 A1 7/2005
WO 2010065113 A1 6/2010

OTHER PUBLICATIONS

Chinese First Office Action, Chinese Application No. 201810405238.0, mailed Jan. 5, 2024 (15 pages).
Chinese Second Office Action, Chinese Patent Application No. 201810405238.0, mailed Mar. 25, 2024 (15 pages).
Notification to Grant Patent Right for Invention, Chinese Patent Application No. 201810405238.0, mailed Apr. 29, 2024 (7 pages).

* cited by examiner

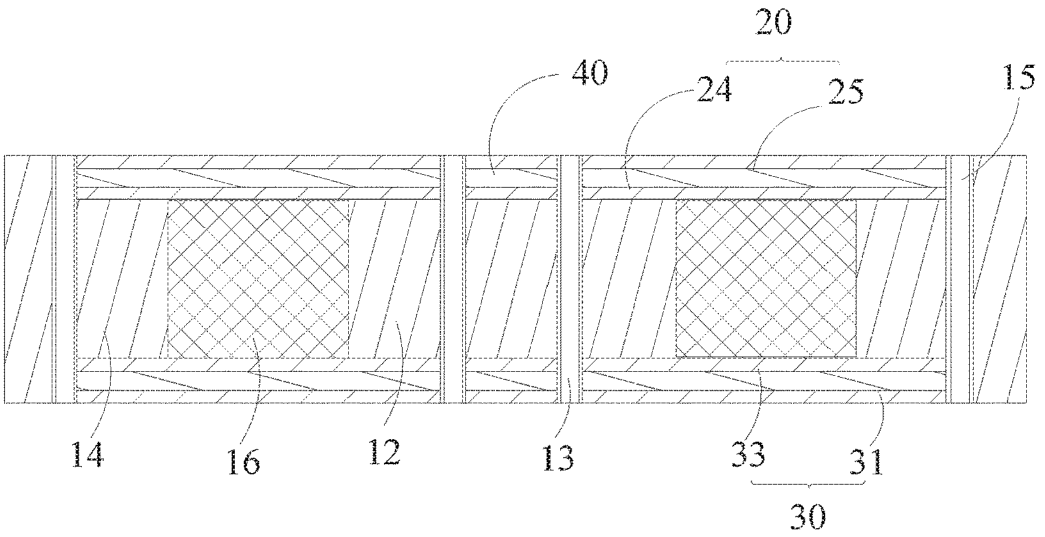

FIG. 9

| | |
|---|---|
| S10 | A substrate defining an annular accommodating groove is provided and the annular accommodating groove divides the substrate into a central part and a peripheral part. |
| S20 | The magnetic core whose shape matches the shape of the annular accommodating groove is embed into the annular accommodating groove. |
| S30 | A conductive sheet are pressed on both sides of the substrate respectively. |
| S32 | A connecting layer is arranged between each conductive sheets and the substrate. |
| S40 | Inner through holes extending through the substrate and the two conductive sheets and corresponding to the location of the central part are formed, and outer through holes extending through the substrate and the two conductive sheets and corresponding to the location of the peripheral part are formed. |
| S50 | Each conductive sheet is transformed into a transmission wire layer which includes a plurality of conductive wire patterns, and a conductive connector is respectively arranged in each inner through hole and each outer through hole. The plurality of conductive wire patterns are spaced from each and arranged along the circumferential direction of the annular accommodating groove, and each conductive wire pattern may bridge one inner through hole and one corresponding outer through hole. All the conductive connectors in the inner through holes and the conductive connectors in the outer through holes may in order connect the corresponding conductive wire patterns of the two transmission wire layers to form coil circuits capable of transmitting current around the magnetic core. The conductive connector can be made based on any method described above. |

FIG. 10

INTEGRATED TRANSFORMER AND ELECTRONIC DEVICE

CROSS-REFERENCE TO RELATED APPLICATIONS

The present disclosure is a continuation-application of International (PCT) Patent Application No. PCT/CN2018/087823 filed on May 22, 2018, which claims foreign priority of Chinese Patent Application No. 201810405238.0, filed on Apr. 29, 2018 in the State Intellectual Property Office of China, the contents of all of which are hereby incorporated by reference.

TECHNICAL FIELD

The present disclosure relates to the field of integrated circuits technology, and in particular, to an integrated transformer and an electronic device.

BACKGROUND

Nowadays, with the development of transformers, how to manufacture integrated transformers with better performance has been paid more and more attention. Integrated transformer usually includes a plurality of transformers used for high voltage isolation. However, signals processed by a plurality of transformers often include signals of a plurality of frequency bands, which can not be used directly. Thus filters are often needed. Filter is a kind of signal processing device. Filter can let the useful signals pass through without attenuation as much as possible, and attenuates the useless signal as much as possible.

At present, the process of signal processing is to transform voltage of the signals first and then to filter the signals. Thus, the process of signal processing is cumbersome and is not conducive to the miniaturization of network transformer.

SUMMARY

The present disclosure provides an integrated transformer and an electronic device so as to solve the above-described problem that the process of signal processing is cumbersome and is not conducive to the miniaturization of network transformer.

To solve the above technical problem, a technical scheme adopted by the present disclosure is to provide an integrated transformer. The integrated transformer includes at least one substrate, wherein the at least one substrate defines a plurality of annular accommodating grooves, each annular accommodating groove divides a corresponding substrate into a central part surrounded by the each annular accommodating groove and a peripheral part arranged around the each annular accommodating groove, each central part defines a plurality of inner through holes therethrough, and each peripheral part defines a plurality of outer through holes therethrough; a plurality of magnetic cores each accommodated in a respective one of the annular accommodating grooves; a plurality of transmission wire layers, wherein on each of two opposite sides of the at least one substrate is arranged one of the transmission wire layers, each of the transmission wire layers comprises a plurality of conductive wire patterns spaced apart from each other and arranged along a circumferential direction of a corresponding one of the annular accommodating grooves, each of the conductive wire patterns bridges one of the inner through holes and one of the outer through holes; and a plurality of conductive connectors arranged in the inner through holes and the outer through holes, and configured to connect in order the conductive wire patterns on the two transmission wire layers on each of the at least one substrate to form a plurality of coil circuits capable of transmitting current around the magnetic core, wherein each of the plurality of coil circuits is located around a corresponding one of the plurality of magnetic cores; wherein the central parts and the peripheral parts of the at least one substrate, the magnetic cores and the conductive connectors assembled on the at least one substrate, and the transmission wire layers on both sides of the at least one substrate cooperatively constitute a plurality of transformers and filters arranged according to preset arrangement manners, at least one of the transformers and at least one of the filters are electrically connected to form a group of electromagnetic assemblies, and any two groups of electromagnetic assemblies are not electrically connected with each other on the at least one substrate.

To solve the above technical problem, another technical scheme adopted by the present disclosure is to provide an electronic device. The electronic includes at least one integrated transformer. The at least integrated transformer includes at least one substrate, wherein the at least one substrate defines a plurality of annular accommodating grooves, each annular accommodating groove divides a corresponding substrate into a central part surrounded by the each annular accommodating groove and a peripheral part arranged around the each annular accommodating groove, each central part defines a plurality of inner through holes therethrough, and each peripheral part defines a plurality of outer through holes therethrough; a plurality of magnetic cores each accommodated in a respective one of the annular accommodating grooves; a plurality of transmission wire layers, wherein on each of two opposite sides of the at least one substrate is arranged one of the transmission wire layers, each of the transmission wire layers comprises a plurality of conductive wire patterns spaced apart from each other and arranged along a circumferential direction of a corresponding one of the annular accommodating grooves, each of the conductive wire patterns bridges one of the inner through holes and one of the outer through holes; and a plurality of conductive connectors arranged in the inner through holes and the outer through holes, and configured to connect in order the conductive wire patterns on the two transmission wire layers on each of the at least one substrate to form a plurality of coil circuits capable of transmitting current around the magnetic core, wherein each of the plurality of coil circuits is located around a corresponding one of the plurality of magnetic cores; wherein the central parts and the peripheral parts of the at least one substrate, the magnetic cores and the conductive connectors assembled on the at least one substrate, and the transmission wire layers on both sides of the at least one substrate cooperatively constitute a plurality of transformers and filters arranged according to preset arrangement manners, at least one of the transformers and at least one of the filters are electrically connected to form a group of electromagnetic assemblies, and any two groups of electromagnetic assemblies are not electrically connected with each other on the at least one substrate.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration, but not for limitation. It should be understood that, one skilled in the art may acquire other drawings based on these drawings, without making any inventive work.

FIG. 9 is a schematic diagram of layering arrangement of input lines and coupling lines according to one embodiment of the present disclosure.

FIG. 10 is a flow chart of a method for making a transformer according to one embodiment of the present disclosure.

DETAILED DESCRIPTION OF THE PREFERRED EMBODIMENTS

Figure 1:
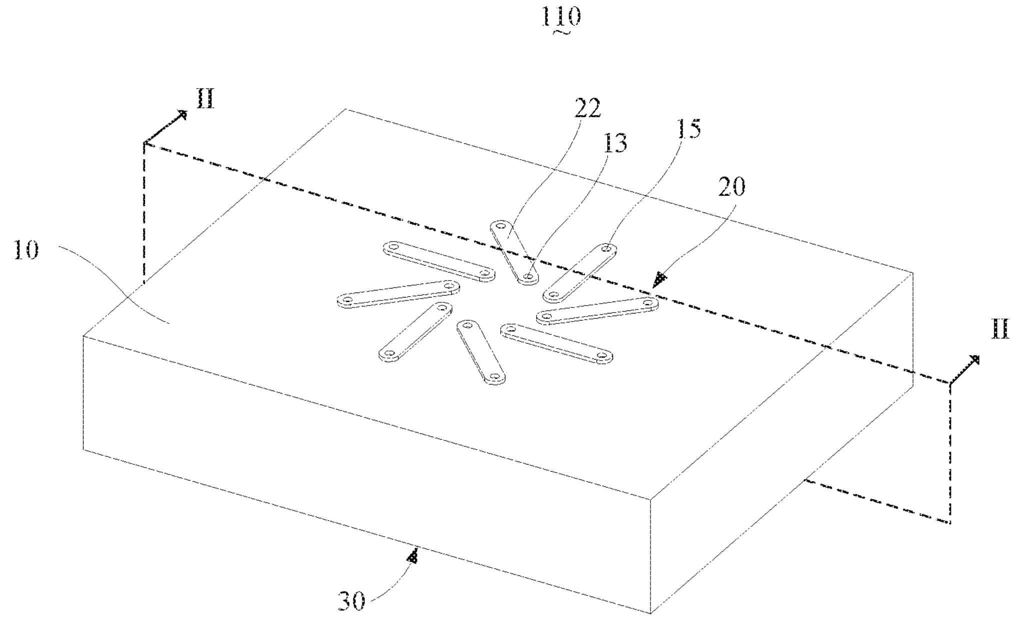
FIG. 1 is a perspective view of a transformer according to one embodiment of the present disclosure.

In order to facilitate the understanding of the present disclosure, the present disclosure will be described more fully hereinafter with reference to the accompanying drawings. Preferred embodiments of the present disclosure are given in the drawings. However, the present disclosure may be embodied in many different forms and is not limited to the embodiments described herein. Rather, these embodiments are provided so that the present disclosure will be more fully understood.

In one aspect, a transformer 110 is provided by the present disclosure. Please referring to FIG. 1 and FIG. 2, FIG. 1 is a perspective view of a transformer according to one embodiment of the present disclosure, and FIG. 2 is a cross section view of the transformer of FIG. 1, taken along a line II-II thereof.

Figure 2:
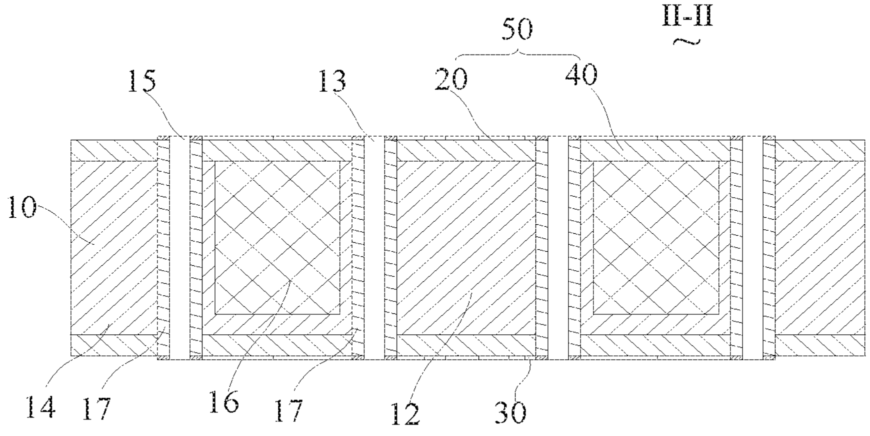
FIG. 2 is a cross section view of the transformer of FIG. 1, taken along a line II-II thereof.

As shown in FIG. 1 and FIG. 2, in the embodiment, the transformer 110 may generally include a substrate 10, a magnetic core 16 embedded in substrate 10, a plurality of conductive connectors 17, and two transmission wire layers (including a first transmission wire layer 20 and a second transmission wire layer 30). The two transmission wire layers may be arranged on two opposite sides of the substrate 10.

In one embodiment, the dielectric loss of the substrate 10 may be less than or equal to 0.02. Specifically, the material of the substrate 10 may have high magnetic transmission speed and low magnetic loss, e.g., organic resin. For example, the material of the substrate 10 may be the material of the model TU863F or TU872SLK of Taiwan Union Technology Corporation, the model M4 or M6 of Panasonic Industrial Devices Materials, the model MW1000 of Nelco Company or the model EM285 of Elite Material Co., Ltd.

In another embodiment, the substrate 10 may also be made of resin materials. Reinforced material is immersed with a resin adhesive and then dried, cut and laminated to form the substrate 10.

Figure 3:
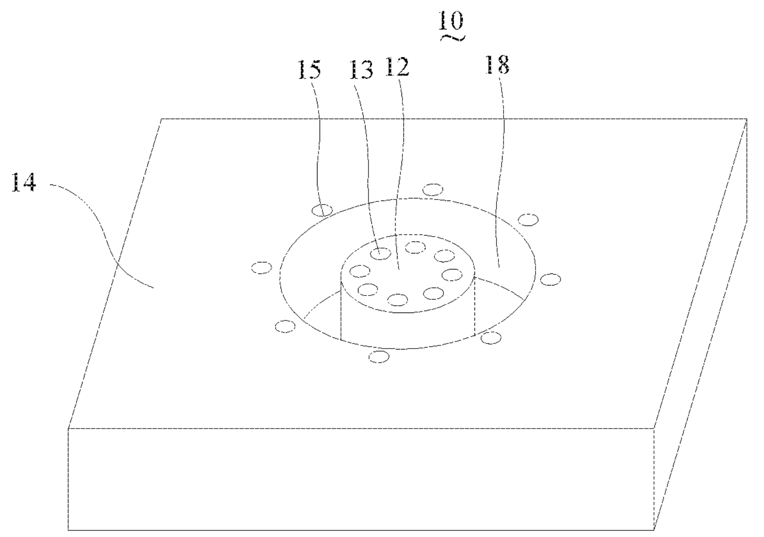
FIG. 3 is a perspective view of the at least one substrate of FIG. 1.

Referring to FIG. 3, the substrate 10 may include a central part 12 and a peripheral part 14 arranged around the central part 12. An annular accommodating groove 18 may be formed between the central part 12 and the peripheral part 14 of the substrate 10, which may be used to accommodate a (shown in FIG. 2).

In the embodiment, the central part 12 and the peripheral part 14 can be an integrated structure, that is, the annular accommodating groove 18 may be arranged at the center of the substrate 10 to divide the substrate 10 into the central part 12 and the peripheral part 14. Certainly, in other embodiments, the central part 12 and the peripheral part 14 can be of separate structure. For example, the peripheral part 14 may define a recess at the middle, and the central part 15 may be fixed (e.g., by adhering) in the recess such that a portion of the recess between the central part 15 and the peripheral part 14 may form the annular accommodating groove 18. The top and bottom surfaces of the central part 12 may be substantially flush with those of the peripheral part 14.

In the embodiment, the cross-sectional shape of the annular accommodating groove 18 is roughly the same as the cross-sectional shape of the magnetic core 16, so that the magnetic core 16 can be easily disposed in the annular accommodating groove 18. The cross-sectional shape of the annular accommodating groove 18 can be annular, square annular, oval and so on. Correspondingly, the shape of the magnetic core 16 may be circular ring, square ring, ellipse and so on.

Referring to FIGS. 1-3, the central part 12 defines a plurality of inner through holes 13 running through the central part 12. The plurality of inner through holes 13 may be disposed adjacent to an outer sidewall of the central part

12 and arranged along a circumference of the central part 12. Correspondingly, the peripheral part 14 may define a plurality of outer through holes 15 running through the peripheral part 14, and the plurality of outer through holes 15 may be arranged adjacent to an inner sidewall of the peripheral part 14. In other words, the inner through hole 13 is arranged on the top surface of the central part 12 around the top inner wall of the magnetic core 16, and the outer through hole 15 is arranged on the top surface of the peripheral part 14 around the top peripheral wall of the magnetic core 16.

Furthermore, a plurality of conductive connectors 17 may be respectively set within the inner through holes 13 and the outer through holes 15. The conductive connectors 17 may electrically connect the first transmission wire layer 20 on one side of the substrate 10 and the second transmission wire layer 30 on an opposite side of the substrate 10.

In an embodiment, the conductive connectors 17 may be a metal column, and the diameter of the metal column corresponding to each inner through hole 13 or each outer through hole may be less than or equal to the diameter of the inner through hole 13 or each outer through hole. The material of the metal column may include but not limit to copper, aluminum, iron, nickel, gold, silver, platinum group, chromium, magnesium, tungsten, molybdenum, lead, tin, indium, zinc or their alloys thereof, etc.

In the embodiment, referring to FIG. 2, a metal layer can be formed on the inner wall of each inner through hole 13 and each outer through hole 15 by means of, for example, electroplating and coating, therefore electrically connecting the transmission wire layers 20 and 30 on the two sides of the substrate 10. The material of the metal layer may be the same as the material of the metal column described in the previous embodiment, and will not be described hereon.

Figure 4:
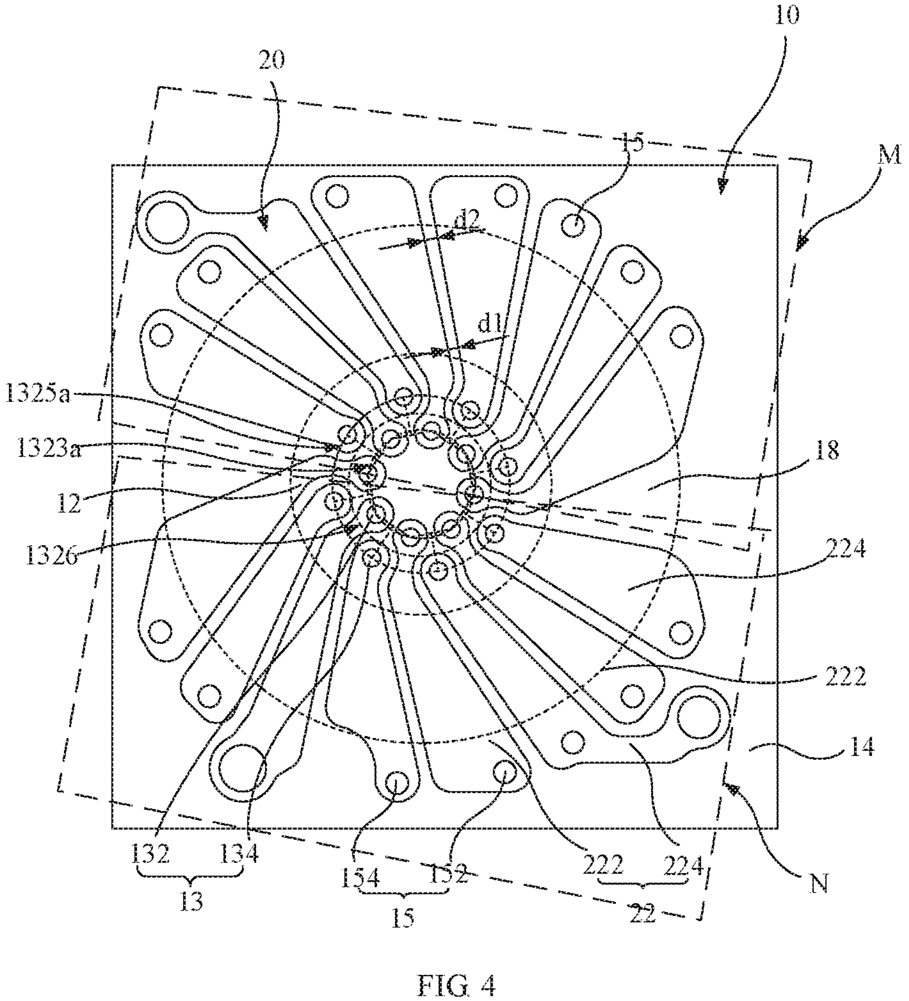
FIG. 4 is a top view of a transformer according to one embodiment of the present disclosure.

Referring to FIG. 4, in the embodiment, the plurality of inner through holes 13 may include first inner through holes 132 and second inner through holes 134, and the number of the first inner through holes 132 may be the same as the number of the second inner through holes 134. The plurality of outer through holes 15 may include first outer through holes 152 and second outer through holes 154.

The center of a first circular trajectory 1323*a* formed by the connecting line of centers of all the first inner through holes 132 on the same plane may coincide with the center of the second circular trajectory 1325*a* formed by the connecting line of centers of all the second inner through holes 134, and the first circular trajectory 1323*a* dose not cross with the second circular trajectory 1325*a*. The first circular trajectory 1323*a* and the second circular trajectory 1325*a* can each be a circular trajectory, an elliptical trajectory or a rectangular trajectory and is limited in the present disclosure.

When the magnetic core 16 is annular, the first inner through holes 132 and the second inner through holes 134 may have a circular arrangement. That is, the connecting line of centers of all the first inner through holes 132 forms the first circular trajectory, and the connecting line of centers of all the second inner through holes 134 forms the second circular trajectory. The center of the first circular trajectory may coincide with the center of the second circular trajectory. In addition, the radius of the second circular trajectory is larger than that of the first circular trajectory. That is, an distance between each second inner through hole 134 and the outside wall of the central part 12 is less than an distance between each first inner through hole 132 and the outside wall of the central part 12.

Moreover, as shown in FIG. 4, in the embodiment, the distances between the center of each second inner through hole 134 and the centers of two adjacent first inner through holes 132 may be the same, that is, the center of each second inner through hole 134 may be located on the perpendicular bisector line of the connecting line of centers of the two first through holes 132 adjacent to the second inner through hole 134.

In the above embodiment, there may be two groups of inner through holes 13 on the central part 12 (the first inner through holes 132 and the second inner through holes 134), and the two trajectories respectively formed by the center connection line of the two groups of inner through holes 13 do not cross. Certainly, in other embodiments, there can be at least three sets of the inner through holes 13 on the central part 12. For example, referring to FIG. 5, in the embodiment, there may be three sets of inner through holes 13 on the central part 12.

Figure 6:
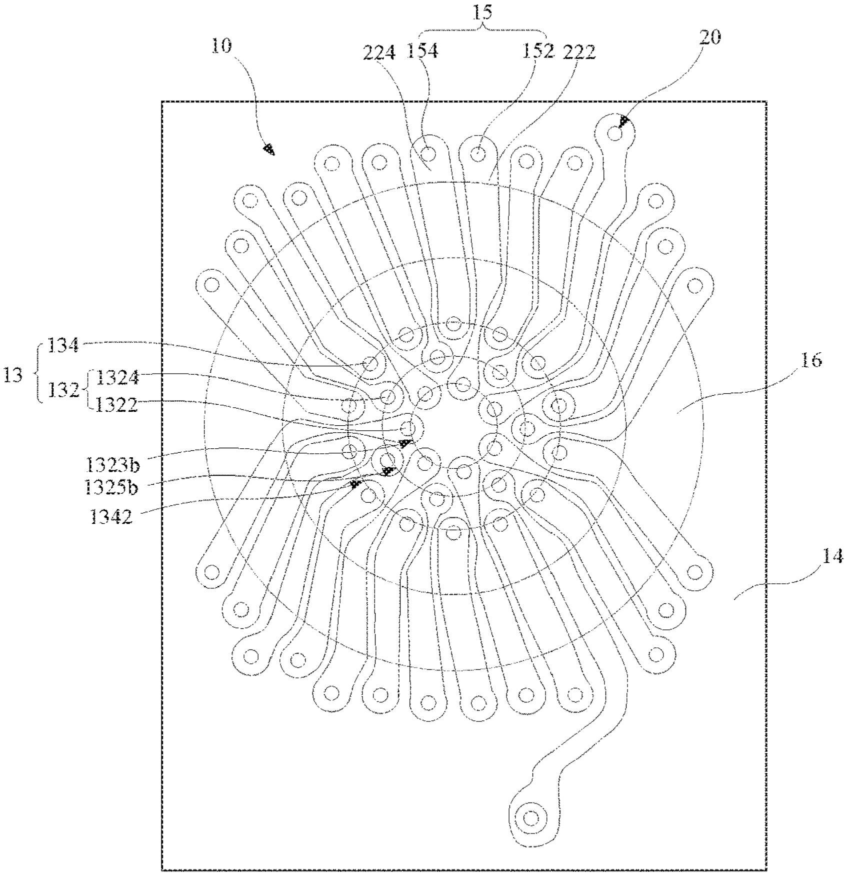
FIG. 6 is a top view of a transformer according to another embodiment of the present disclosure.

Specifically, referring to FIG. 6, in the embodiment, the first inner through holes 132 may include first sub inner through holes 1322 and second sub inner through holes 1324. The sum of the number of the first sub inner through holes 1322 and the second sub inner through holes 1324 may be the same as the number of the second inner through holes 134.

In the embodiment, the connecting line of centers of all the first sub inner through holes 1322 may form a first annular trajectory 1323*b*, the connecting line of centers of all the second sub inner through holes 1324 may form a second annular trajectory 1325*b*, and the connecting line of centers of all the second inner through holes 134 may form a third annular trajectory 1342. The first annular trajectory 1323*b*, the second annular trajectory 1325*b* and the third annular trajectory 1342 may have a same center point but do not cross. The first circular trajectory 1323*b*, the second annular trajectory 1323*b* and the third annular trajectory 1342 can be circular trajectory, oval trajectory or rectangular trajectory, and will not be limited in the present disclosure.

When the magnetic core 16 is circular, the first circular trajectory is formed by the connecting line of centers of all the first sub inner through holes 1322, the second circular trajectory is formed by the connecting line of centers of all the second sub inner through holes 1324, and the third circular trajectory is formed by the connecting line of centers of all the second inner through holes 134. The centers of the first circular trajectory, the second circular trajectory and the third circular trajectory may be the same. The radius of the first circular trajectory is smaller than that of the second circular trajectory, and the radius of the second circular trajectory may be smaller than that of the third circular trajectory. That is, the second circular trajectory may be located between the first circular trajectory and the third circular trajectory.

In the embodiment, referring to FIG. 6, all the first sub inner through holes 1322 may be uniformly distributed in the central part 12. The distances between the center of each second sub inner through holes 1324 and the centers of two adjacent first sub inner through holes 1322 may be equal. Besides, the distances between the center of each second inner through hole 134 and the centers of two adjacent second sub inner through holes 1324 may be equal. That is to say, the center of each second sub inner through hole 1324 may be located on the perpendicular bisector of the connecting line of centers of the two adjacent first sub inner through holes 1322, and the center of each second inner through hole 134 is located on the perpendicular bisector of the connecting line of centers of the two adjacent second sub inner through holes 1324.

In the above embodiment, the above-described arrangement of the first sub inner through holes 1322 and the second sub inner through holes 1324 not only makes the inner through holes 13 on the central part 12 uniformly distributed, but also allows the central part 12 to define more inner through holes 13. Thus, the number of input lines 222 and coupling lines 224 on the transformer 110 can be increased, therefore improving the coupling performance of the transformer 110.

Certainly, more inner through holes 13 can also be arranged on the central part 12 by the method of reducing the diameter of the inner through hole 13. However, if the diameter of the inner through hole 13 is too small, it needs very high machining accuracy which leads to a high product processing cost. If the diameter of the inner through hole 13 is too large, the number of the inner through holes 13 on the central part 12 will be limited, as well as the number of the input lines 222 and the coupling lines 224, thus influencing the coupling performance of the transformer 110. Therefore, in the embodiment, the diameter of the inner through hole 13 is about 1.5~3.1 mm (millimeter).

Referring to FIGS. 4 and 6, the outer through holes 15 may be distributed at the side of the peripheral part 14 close to the magnetic core 16, and a plurality of outer through holes 15 may be uniformly distributed.

Specifically, the outer through holes 15 may be uniformly distributed at the side of the peripheral part 14 close to the magnetic core 16. It is better to have a small distance between the magnetic core 16 and the outer through holes 15. It should be noticed that the distance between the outer through hole 15 and the magnetic core 16 should also meet the processing requirements of avoiding interference between the side wall of the outer through hole 15 and the inner wall of the peripheral part 14, and meet the resistance to electrical breakdown.

In the embodiment, the annular magnetic core 16 can be made by sequentially stacking a number of annular sheets, or made by winding a narrow and long metal material, or be made by sintering a number of metal mixtures. The annular magnetic core 16 can be formed in a different ways, which can be flexibly selected according to different materials.

The magnetic core 16 can be an iron core or can be made of other magnetic metal oxide, such as Manganese zinc ferrite (Mn—Zn ferrite) and Nickel zinc ferrite (Ni—Zn ferrite) and so on. The Mn—Zn ferrite has characteristics such as high permeability, high magnetic flux density and low loss. The Ni—Zn ferrite has characteristics such as high impedance and low permeability. In the embodiment, the magnetic core 16 is made by sintering Mn—Zn ferrite at high temperature.

Referring to FIGS. 1-3, the first transmission wire layer 20 and the second transmission wire layer 30 may be made of metal materials. The metal materials for forming the first transmission wire layer 20 and the second transmission wire layer 30 may include but not limit to copper, aluminum, iron, nickel, gold, silver, platinum group, chromium, magnesium, tungsten, molybdenum, lead, tin, indium, zinc or any alloy thereof etc.

In the embodiment, the metal materials of the first transmission wire layer 20 and the second transmission wire layer 30 and the metal materials of the conductive connectors 17 in the inner through holes 13 and the outer through holes 15 can be the same. Taking copper as an example, the first transmission wire layer 20 can be formed on one side of the substrate 10 and the second transmission wire layer 30 can be formed on an opposite side of the substrate 10 by using the substrate 10 as the cathode and placing the substrate 10 in the salt solution containing copper ions, and the conductive connectors 17 can be formed on the inner wall of each inner through hole 13 and each outer through hole 15 at the same time.

In another embodiment, the materials of the first transmission wire layer 20 and the second transmission wire layer 30 may be different from the materials of the conductive connectors 17 in the inner through hole 13 and the outer through hole 15.

In the embodiment, the thickness of the first transmission wire layer 20 and the second transmission wire layer 30 may be both in the range of 17~102 μm (micron meter). In one embodiment, in order to arrange more conductive wire patterns 22 on the first transmission wire layer 20 and the second transmission wire layer 30 so as to increase the coupling degree of the transformer 110, the thickness of the first transmission wire layer 20 and the second transmission wire layer 30 may be in the range of 17~34 μm. In other embodiments, in order to improve the over current capacity of the first transmission wire layer 20 and the second transmission wire layer 30, the thickness of the first transmission wire layer 20 and the second transmission wire layer 30 can be in the range of 40~100 μm. Alternatively, the thickness of the first transmission wire layer 20 and the second transmission wire layer 30 can be in the range of 65~80 μm. This is because when the first transmission wire layer 20 and the second transmission wire layer 30 are etched to form the conductive wire patterns 22, if the thickness is too large (i.e., more than 80 μm), and the distance between two adjacent conductive wire patterns 22 of the same transmission wire layer is too small, the etching may not be complete, thus the two adjacent conductive wire patterns 22 may still be connected which may cause short circuit, and if the thickness is too small (i.e., less than 40 μm), the current carrying capacity of conductive wire pattern 22 may be reduced.

Figure 5:
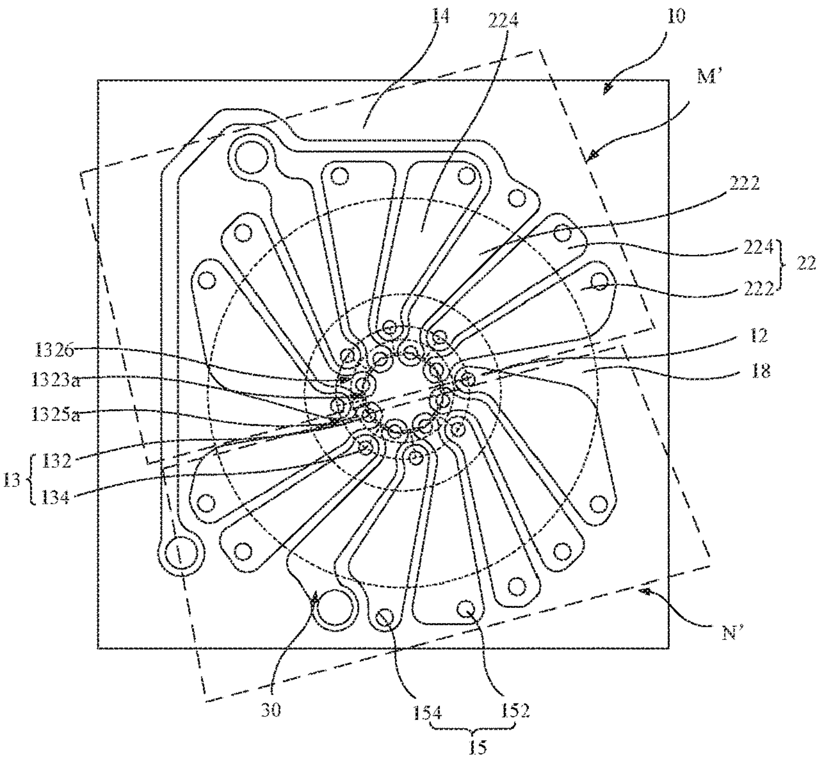
FIG. 5 is a bottom view of the transformer of FIG. 4.

Further referring to FIGS. 4 and 5, both the first transmission wire layer 20 and the second transmission wire layer 30 may include a plurality of conductive wire patterns 22, Each conductive wire pattern 22 may bridge one inner through hole 13 and one corresponding outer through hole 15. One end of the conductive wire pattern 22 may connect with the conductive connector 17 in the inner through hole 13, and the other end of the conductive wire patterns 22 may connect with the conductive connector 17 in the outer through hole 15. Therefore, the conductive connectors 17 in the inner through holes 13 and the conductive connectors 17 in the outer through holes 15 may connect with the conductive wire pattern 22 on the first transmission wire layer 20 and the second transmission wire layer 30 be in order, thus, forming coil circuits capable of transmitting current around the magnetic core 16.

In one embodiment, the conductive connectors 17 may be metal columns, and the conductive connectors 17 can be welded with the conductive wire patterns 22 on the first transmission wire layer 20 and the second transmission wire layer 30.

In another embodiment, the conductive connectors 17 may be metal layer formed on the inner wall of the inner through hole 13 and the outer through hole 15 by methods such as electroplating and coating. The metal layer may electrically connect with one conductive wire pattern 22 located at the first transmission wire layer 20 and one conductive wire pattern 22 located at the second transmission wire layer 30.

In another embodiment, the conductive connectors 17 can be integrally formed with the first transmission wire layer 20 and the second transmission wire layer 30 by electroplating and etching. Then a plurality of conductive wire patterns 22 are formed on the first transmission wire layer 20 and the second transmission wire layer 30 to be integrated with the conductive connectors 17.

In the embodiment, the plurality of conductive wire patterns 22 can be formed by etching the first transmission wire layer 20 and the second transmission wire layer 30. For example, a metal layer may be firstly formed on both sides of the substrate 10. A masking layer may be formed on the metal layer by exposing and developing. Then etching solution may be applied to the metal layer with the masking layer, and thus a portion of the metal layer which is not covered by the masking layer may be removed. Finally, the masking layer may be removed, and the first transmission line layer 20 and the second transmission line layer 30 may be acquired.

In the embodiment, as shown in FIG. 4 and FIG. 5, the plurality of conductive wire patterns 22 on the first transmission wire layer 20 and the second transmission wire layer 30 can be divided as input lines 222 and coupling lines 224. In other words, on one transmission wire layer may be arranged both the input lines 222 and the coupling lines 224. Each conductive wire pattern 22 bridging one first inner through hole 132 and one corresponding first outer through hole 152 may be set as the input line 222, and the one end of each input line 222 is electrically connected with the conductive connector 17 in the first inner through hole 132 and another end of each input line 222 may be electrically connected with the conductive connectors 17 in the first outer through hole 152. Each conductive wire pattern 22 bridging one second inner through hole 134 and one corresponding second outer through hole 154 may be set as the coupling line 224, and one end of each coupling line 224 is electrically connected with the conductive connector 17 in the second inner through hole 134 and another end of each coupling line 224 may be electrically connected with the conductive connector 17 in the second outer through hole 154.

In the above described embodiment, the input line 222 is the conductive wire pattern 22 bridging the first inner through hole 132 and the first outer through hole 152, and the coupling line 224 is the conductive wire pattern 22 bridging the second inner through hole 134 and the second outer through hole 154. Certainly, in other embodiments, the coupling line 224 may be the conductive wire pattern 22 bridging the first inner through hole 132 and the first outer through hole 152, and the input line 222 may be the conductive wire pattern 22 bridging the second inner through hole 134 and the second outer through hole 154.

In one embodiment, the number of input lines 222 can be the same as the number of coupling lines 224. In this circumstance, the turns of input line 222 and the turns of coupling line 224 are the same in the transformer 110. That is, the turn ratio of the input line 222 to the coupling line 224 may be 1:1. In another embodiment, the number of input lines 222 may be different from the number of coupling lines 224. For example, in another embodiment, the number of input lines 222 may be half of the number of coupling lines 224. That is, the turn ratio of the input lines 222 to the coupling lines 224 may be 1:2. In another embodiment, the number of input lines 222 can also be twice of the number of coupling lines 224. That is, the turn ratio of the input lines 222 to the coupling lines 224 may be 2:1. Therefore, the turn ratio of the input lines 222 and the coupling lines 224 can be selected according to the actual needs, and will not be limited in the present disclosure.

Further referring to FIGS. 4 and 5, in the embodiment, a first circle 1326 may be defined between the first circular trajectory **1323*a* and the second circular trajectory 1325*a*, and the center of the first circle 1326 may coincide with the center of the first circular trajectory 1323*a*. That is, the radius of the first circle 1326 is larger than or equal to the radius of the first circular trajectory 1323*a* and smaller than or equal to the radius of the second circular trajectory 1325*a*. The arc length of any conductive wire pattern 22 on the first circle 1326 may be identical. That is, widths of each conductive wire pattern 22 may be the same on the same circle in the area between the first circular trajectory 1323*a* and the second circular trajectory 1325*a*. In the embodiment, any circle between the first circular trajectory 1323*a* and the second circular trajectory 1325*a* and with the same center of the first circular trajectory 1323*a* and the second circular trajectory 1325*a* may be taken as the first circular 1326. That is, any circle with a same center as the first circular track 1323*a* and the second circular track 1325*a* and a radius no less than that of the first circular track 1323*a* and no more than that of the second circular track 1325*a* may be taken as the first circle 1326**.

In the embodiment, as shown in FIG. 4, for at least some of the conductive wire patterns 22 on the same transmission wire layer, such as the first transmission wire layer 20 or the second transmission wire layer 30, the farther from the corresponding inner through hole 13 it is, the bigger the width of the conductive wire pattern 22 is. Since the plurality of conductive wire patterns 22 are spaced apart and arranged along the circumferential direction of the annular accommodating groove 18, and the width of at least some of the conductive wire patterns 22 may gradually increase along a wiring direction from the inner through holes 13 to the outer through holes 15, the distance between at least some of adjacent conductive wire patterns 22 may keep consistent within the projection area of the corresponding the annular accommodating groove 18.

The distance between adjacent conductive wire patterns 22 may refer to the width of the gap between the two adjacent conductive wire patterns 22.

Furthermore, in the embodiment, as shown in FIG. 4, the input lines 222 and the coupling lines 224 on the same transmission wire layer such as the first transmission wire layer 20 or the second transmission wire layer 30 may be divided into two groups of wire patterns M and N respectively. Two groups of wire patterns M and N on each transmission wire layer are arranged adjacent to each other and are arranged around the circumferential direction of the magnetic core 16. One of the two groups of wire patterns M and N may be arranged on one half of the substrate 10 while the other of the two groups of wire patterns M and N may be arranged on another half of the substrate 10.

In addition, two groups of wire patterns M and N of the the first transmission wire layer 20 may be a mirror image of the two groups of wire patterns M' and N' of the second transmission wire layer 30. For example, FIG. 4 shows the wire patterns M and N of the first transmission wire layer 20 seen from one side (e.g., the upper side) of the transformer, and FIG. 5 shows the wire patterns M' and N' of the second transmission wire layer 30 seen from the other side (e.g., the lower side) of the transformer. It can be seen that the wire patterns M and N may be symmetrical to the wire patterns M' and N' in this embodiment.

Furthermore, referring to FIG. 4 and FIG. 5, in each group of wire patterns M and N, the distance of any two adjacent conductive wire patterns 22 (such as one input line 222 and one adjacent coupling line 222, two adjacent coupling lines 224, or two adjacent input lines 222) in the projection area of the annular accommodating groove 18 may keep consistent along the wiring direction of any one of the conductive wire patterns 22. For example, in FIG. 4, the distances between two adjacent input line 222 and coupling line 224 in the projection area of the annular accommodating groove 18 is d1 and d2 respectively along the wiring direction of any corresponding conductive wire pattern 22. That is, the distances between two adjacent conductive wire patterns 22 in any group wire pattern M or N may be respectively d1 and d2 at different radial positions. As described above, this distance may keep consistent within the area corresponding to the annular accommodating groove 18, that is, d1 may be equal to d2. In the embodiment, the distance between two adjacent conductive wire patterns 22 in the projection area of the annular accommodating groove 18 can be 50~150 μm.

It can be understood that in the projection area of the annular accommodating groove 18, the smaller the distance between two adjacent conductive wire patterns 22 is, the higher the coupling degree of input line 222 and coupling line 224 becomes. Therefore, the distance between adjacent conductive wire patterns 22 of the same layer should be kept as small as possible during the formation of the conductive wire patterns 22 on the first transmission wire layer 20 and the second transmission wire layer 30. In one embodiment, the distance between the two adjacent conductive wire patterns 22 in the projection area of the annular accommodating groove 18 may be the minimum allowable clearance between the adjacent two conductive wire patterns 22 to improve the coupling. The minimum allowable clearance between the two adjacent conductors 22 is a safe distance, which can ensure that no high voltage breakdown will occur between adjacent conductive wire patterns 22. Therefore, the service life of the transformer 110 can be prolonged.

In the embodiment, an insulating material can be disposed between each two adjacent conductive wire patterns 22. The insulating material can be PI (polyimide), organic film, ink and so on. In order to improve the withstand voltage capability between each two adjacent conductive wire patterns 22, PI with high insulation coefficient can be selected.

The safe distance of the adjacent conductive wire patterns 22 is related to the properties of the insulating material. Therefore, the distance between adjacent conductive wire patterns 22 should be flexibly controlled to be larger than the safe distance based on the characteristics of the selected insulation materials during the formation of the conductive wire patterns 22, thereby avoiding high voltage breakdown which may lead to the damage of the transformer 110.

In the embodiment, the wire patterns M and N on the first transmission wire layer 20 and the wire patterns M', N' on the second transmission wire layer 30 are arranged around the magnetic core 16. The width of each conductive wire pattern 22 may gradually increase in the wiring direction of the conductive wire pattern 22, that is, the width of each conductive wire pattern 22 may gradually increase from the corresponding inner through hole 13 to the corresponding outer through hole 15. Thus, the distance between the adjacent two conductive wire patterns 22 may be kept consistent in the projection area of the annular accommodating groove 18. Thus, the conductive wire patterns 22 on the first transmission wire layer and the second transmission wire layer 30 are arranged more closely, and the line pattern M, N, M' or N' consisting of the conductive wire patterns 22 may better cover the magnetic core 16. Thus, the leakage inductance can be reduced and the coupling performance of transformer 110 can be improved.

Figure 13:
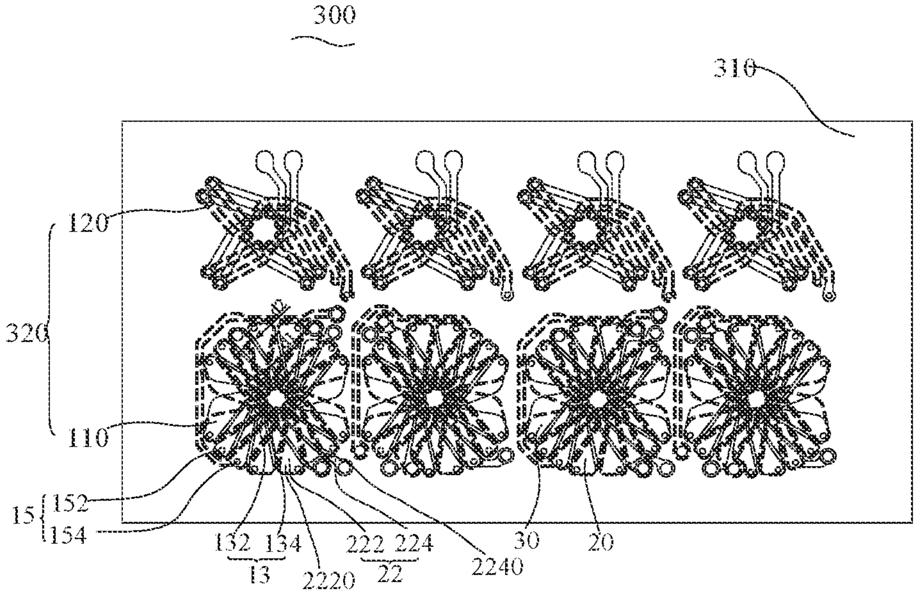
FIG. 13 is a plan view of an integrated transformer including filters and transformers installed in the same layer according to one embodiment of the present disclosure.

In one embodiment, further referring to FIGS. 4-5 and 7-8, on the same transmission wire layer (the first transmission wire layer 20 or the second transmission wire layer 30), the input lines 222 may be divided into a plurality of input line groups 2220 (shown in FIG. 13) and the coupling lines 224 may be divided into a plurality of coupling line groups 2240 (shown in FIG. 13). Each input line group may consist of at least one input line 222 and each coupling line group may consist of at least one coupling line 224. The input line groups 2220 and the coupling line groups 2240 may be alternately arranged along the circumferential direction of the magnetic core 16.

In one embodiment, referring to FIGS. 4 and 5, each input line group may include only one input line 222, and each coupling line group may include only one coupling line 224. The plurality of input line groups 2220 and the plurality of coupling line groups 2240 may be alternately arranged along the circumferential direction of the magnetic core 16. That is, the conductive wire patterns 22 on the same transmission wire layer (the first transmission wire layer 20 or the second transmission wire layer 30) are in order arranged in the order of input line 222, coupling line 224, input line 222 and coupling line 224.

Figure 7:
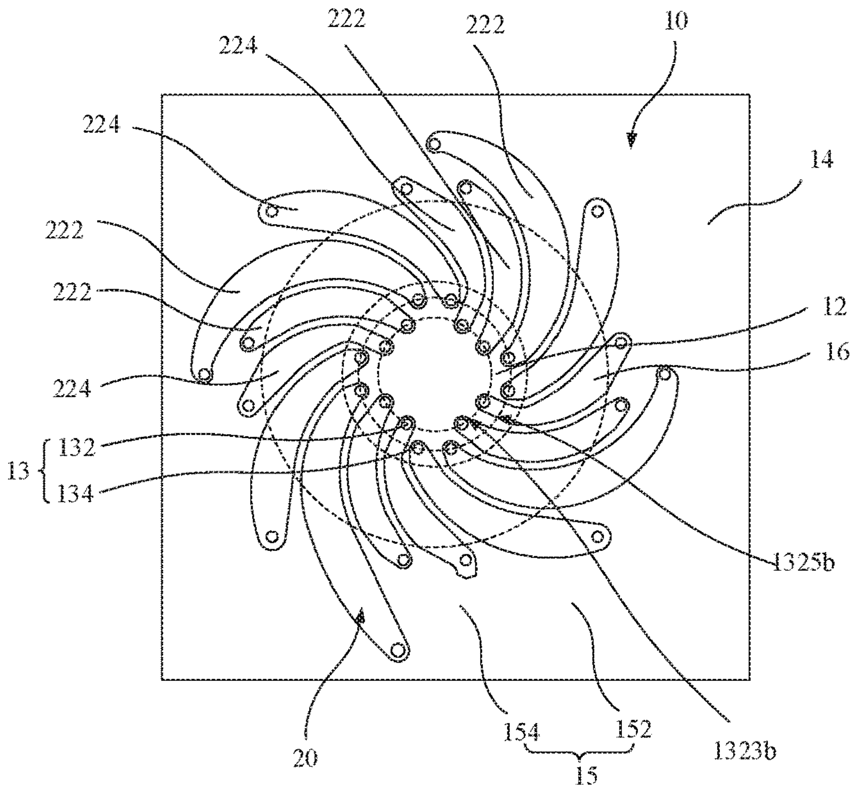
FIG. 7 is a schematic diagram of wire pattern of the first transmission wire layer according to one embodiment of the present disclosure.
Figure 8:
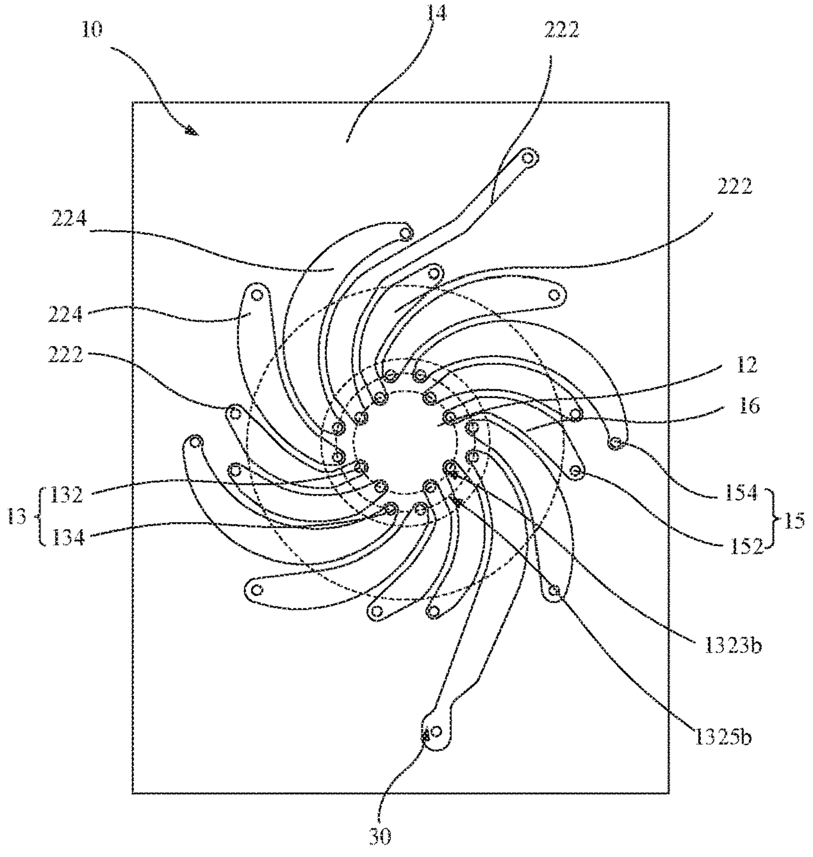
FIG. 8 is a schematic diagram of wire pattern of the second transmission wire layer of FIG. 7.

In another embodiment, referring to FIGS. 7 and 8, each input line group may include two input lines 222, and each coupling line group may include two coupling lines 224. The plurality of input line groups 2220 and the plurality of coupling line groups 2240 are alternately arranged along the circumference of the magnetic core 16. That is, the conductive wire patterns 22 on the same signal transmission wire layer are in order arranged in the order of two input lines 222, two coupling lines 224, two input lines 222 and two coupling lines 224.

In another embodiment, each input line group may also include at least three continuously arranged input lines 222, and each coupling line group may also include at least three continuously arranged coupling lines 224. The plurality of input line groups 2220 and the plurality of coupling line groups 2240 are alternately arranged along the circumferential direction of the magnetic core 16.

In one embodiment, when the number of input lines 222 is the same as the number of coupling lines 224, the number of the conductive wire patterns 22 in each input line group may be the same as the number of the conductive wire patterns 22 in each coupling line group. For example, when each of the input line groups 2220 and the coupling line groups 2240 includes three conductive wire patterns 22, the conductive wire patterns 22 on the same signal transmission wire layer may be in order arranged in the order of three input lines 222, three coupling lines 224, three input lines 222 and three coupling lines 224.

In another embodiment, when the number of input lines 222 is different from the number of coupling lines 224, the number of the conductive wire patterns 22 in each input line group may be different from the number of the conductive wire patterns 22 in each coupling line group. For example, when the number of the input lines 222 is the half of the number of the coupling lines 224, the number of the conductive wire patterns 22 in each input line group may be the half of the number of the conductive wire patterns 22 in each coupling line group. Supposing that each input line group includes only one conductive wire pattern 22 and each coupling line group includes two conductive wire patterns 22, the conductive wire patterns 22 on a same signal transmission wire layer may be in order arranged in the order of input line 222, the coupling line 224, the coupling line 224, the input line 222, the coupling line 224 and the coupling line 224.

In the embodiment, since the plurality of input line groups 2220 and the plurality of coupling line groups 2240 on a same transmission wire layer are alternately arranged along the circumferential direction of the magnetic core 16, the distance between the input line 222 and the coupling line 224 may be reduced. Thus the coupling performance of the transformer 110 can be improved.

In one embodiment, referring to FIGS. 1 and 2, a connection layer 40 can be arranged between the first transmission wire layer 20 and the at least one substrate 10, and between the second transmission wire layer 30 and the at least one substrate 10 respectively, for fixing the first transmission wire layer 20 and the second transmission wire layer 30. The first transmission line layer 20 or the second transmission line layer 30 together with the corresponding connection layers 40 may form a transmission unit 50. That is, the first transmission wire layer 20 and the connecting layer 40 arranged between the first transmission wire layer 20 and the substrate 10 can form a transmission unit 50, and the second transmission wire layer 30 and the connection layer 40 arranged between the first transmission wire layer 30 and the substrate 10 can also form a transmission unit 50. In one embodiment, each side of the substrate 10 may include only one transmission unit 50. The connection layer 40 of the transmission unit 50 may be located between the substrate 10 and the corresponding first transmission wire layer 20 or the corresponding the second transmission wire layer 30. The dielectric loss of at least one of the two connecting layers 40 may be less than or equal to 0.02.

Specifically, the material of the connection layer 40 may have high magnetic transmission speed and low magnetic loss, and may be organic resin. For example, the material of the connection layer 40 can be the material of the Model TU863F or TU872SLK made by Taiwan Union Technology Corporation, the Model M4 or M6 made by Panasonic Industrial Devices Materials, the Model MW1000 made by Nelco Company or the EM285 made by Elite Material Co., Ltd.

In another embodiment, at least two stacked transmission units 50 may be arranged on any one side of the opposite two sides of the substrate 10. For example, in some embodiments, two first transmission wire layers 20 may be subsequently disposed on one side of the substrate 10. Between the substrate 10 and one of the two first transmission wire layers 20, and between the two first transmission wire layers 20 may be respectively disposed a connection layer 40. In other embodiments, two second transmission wire layers 30 may be disposed on the opposite side of the substrate 10. Between the substrate 10 and one of the two second transmission wire layers 30, and between the two second transmission wire layers may be respectively disposed a connection layer 40. The dielectric loss of at least one connecting layer 40 is less than or equal to 0.02. In the embodiment, the dielectric loss of the connection layer 40 between two transmission units 50 at the same side of the substrate 10 may be less than or equal to 0.02.

Therefore, the signal loss during signal transmission in the first transmission wire layer 20 and the second transmission wire layer 30 may be reduced by using a connecting layer 40 with dielectric loss less than 0.02 to fix the corresponding first transmission wire layer 20 and the corresponding second transmission wire layer 30 on the substrate 10.

In the above embodiment, the input lines 222 and the coupling lines 224 are arranged at the same first transmission wire layer 20 or the second transmission wire layer 30. That is, both the first transmission wire layer 20 and the second transmission wire layer 30 include the input lines 222 and the coupling lines 224. However, in other embodiments, the input lines 222 and the coupling lines 224 may also be respectively arranged in different first transmission wire layers 20 or second transmission wire layers 30.

For example, referring to FIG. 9, in another embodiment, the first transmission wire layer 20 may include a first input line layer 24 and a first coupling line layer 25. The second transmission wire layer 30 may also include a second input line layer 31 and a second coupling line layer 33. The first input line layer 24 is electrically connected with the second input line layer 31, and the first coupling line layer 25 is electrically connected with the second coupling line layer 33. The first input line layer 24 and the first coupling line layer 25 may be stacked together and arranged at one side of the substrate 10 along the axial direction of the inner through hole 13, and a connecting layer 40 may be disposed between the first input line layer 24 and the first coupling line layer 25. The second input line layer 31 and the second coupling line layer 33 may be stacked together and arranged at the opposite side of the substrate 10 along the axial direction of the inner through hole 13, and a connecting layer 40 may be disposed between the second input line layer 31 and the second coupling line layer 33. The connecting layer 40 can be made of insulating adhesive material, and can also be made of the previous described material with a dielectric loss less than 0.02.

In the embodiment, the first input line layer 24 and the second input line layer 31, the first coupling line layer 25 and the second coupling line layer 33 may all include a plurality of conductive wire patterns (not shown). Each conductive wire pattern on the first input line layer 24 and the second input line layer 31 is an input line, and each conductive wire pattern on the first coupling line layer 25 and the second coupling line layer 33 is a coupling line. One input line layer (e.g., the first input line layer 24 or the second input line layer 31) may include a plurality of input line groups 2220, each of which may consist of at least one input line. Similarly, one coupling line layer (e.g., the first coupling line layer 25 or the second coupling line layer 33) may include a plurality of coupling line groups 2240, each of which may consist of at least one coupling line. The projections of the plurality of input line groups 2220 of the first input line layer 24 on the substrate 10 and the projections of the plurality of coupling line groups 2240 of the first coupling line layer 25 on the substrate 10 may be alternately arranged along the circumferential direction of the magnetic core 16. Similarly, the projections of the plurality of input line groups 2220 of the second input line layer 31 on the substrate 10 and the projections of the plurality of coupling line groups 2240 of the second coupling line layer 33 on the substrate 10 are alternately arranged along the circumferential direction of the magnetic core 16. The first input line layer 24, the second input line layer 31, the first coupling line layer 25, the second coupling line layer 33 and the substrate 10 can be stacked in a predetermined order. In one embodiment, the stack order may be: the first input line layer 24, the first coupling line layer 25, the substrate 10, the second input line layer 31 and the second coupling line layer 33. In another embodiment, the stack order may be: the first input line layer 24, the first coupling line layer 25, the substrate 10, the second coupling line layer 33 and the second input line layer 31. In yet another more embodiment, the stack order may be:

the first coupling line layer 25, the first input line layer 24, the substrate 10, the second input line layer 31 and the second coupling line layer 33.

For all kinds of electromagnetic devices, all the conductive wire patterns 22 used for forming the coil can be arranged in layers according to the above described way.

In one embodiment, when each input line group only includes one input line and each coupling line group only includes one coupling line, the projection pattern of the plurality of input line groups 2220 and the plurality of coupling line groups 2240 on the substrate 10 may be similar to the wire pattern shown in FIG. 4 or FIG. 5.

In another embodiment, when each input line group includes two input lines and each coupling line group includes only two coupling lines, the projection pattern of the plurality of input line groups 2220 and the plurality of coupling line groups 2240 on the substrate 10 may be similar to the wire pattern shown in FIG. 7 or FIG. 8.

In another embodiment, the projections of the plurality of input line groups 2220 of the input line layer 24 on the substrate 10 and the projection of the plurality of coupling line groups 2240 of the coupling line layer 25 on the substrate 10 can also at least partially overlapped with each other. Besides, the projection of the plurality of input line groups 2220 of the input line layer 31 on the substrate 10 and the projection of the plurality of coupling line groups 2240 of the coupling line layer 33 on the substrate 10 may also be at least partially overlapped with each other.

In the embodiment, since the plurality of input lines and the plurality of coupling lines on the first transmission wire layer 20 and the second transmission wire layer 30 located on the two opposite sides of the substrate 10 are arranged on different layers, the wiring space of the transformer 110 can be increased. Thus the volume of the conductive wire pattern 22 can be increased, and the over current capacity of the transformer 110 may be improved.

Referring to FIGS. 4 and 10, a method for making the transformer 110 is provided of the present disclosure. Referring to FIGS. 1-3, the method for making the transformer 110 may include operations at blocks illustrated in FIG. 10.

At block S10, a substrate 10 defining an annular accommodating groove 18 is provided and the annular accommodating groove 18 divides the substrate 10 into a central part 12 and a peripheral part 14.

In the embodiment, the substrate 10 can be a plate that does not contain conductive metal layers, and the annular accommodating groove 18 can be defined on any surface of the substrate 10. In another embodiment, a base block may also be provided, and the base block may include the substrate 10, the connecting layer and the transmission wire layer in order stacked. The annular accommodating groove 18 may be defined on one side of the substrate 10 on which the transmission wire layer has not been formed to divide the substrate 10 into a central part 12 and a peripheral part 14.

The substrate 10 can be made of resin material with fire resistance rating of FR4, and the annular accommodating groove 18 may be formed on the substrate 10 by groove milling processing.

At block S20, the magnetic core 16 whose shape matches the shape of the annular accommodating groove 18 is embed into the annular accommodating groove 18.

The magnetic core 16 may include Mn—Zn ferrite or Ni—Zn ferrite or other magnetic metal oxides. The magnetic core 16 can be engaged in the annular accommodating groove 18 by means of interference fit. Thus the magnetic core 16 can be fixed in the annular accommodating groove 18 of the substrate 10. In another embodiment, the size of the magnetic core 16 may be slightly smaller than the size of the annular accommodating groove 18. The height of the magnetic core 16 may be less than or equal to the height of the annular accommodating groove 18 to reduce the pressure applied on the magnetic core 16 when the whole structure is compressed together, and to reduce the breaking probability of the magnetic core 16.

At least a portion of the surface of the magnetic core 16 can be wrapped with elastic material. Then the magnetic core 16 may be disposed in the corresponding annular accommodating groove 18. It should be noticed that in some embodiments, there may be a plurality of magnetic cores 16 and a plurality of annular accommodating grooves 18, and the plurality of magnetic cores 16 may be respectively disposed in a corresponding annular accommodating groove 18. In this circumstance, at least one of the magnetic cores 16 may be wrapped with elastic material. Then an insulating layer may be arranged on the surface of the substrate 10 which is also the opening side of the annular accommodating groove 18 on the substrate 10 to form a cavity receiving the magnetic core 16. The cavity may be either closed or unenclosed.

Furthermore, a coating layer for fixing in the annular accommodating groove 18 may be arranged on the outer surface of the magnetic core 16.

At block S30, a conductive sheet are compressed on each side of the substrate 10.

Operation at block S30 may include the operation that the first conductive sheet, the first connecting sheet, the at least one substrate, the second connecting sheet and the second conducting sheet are successively stacked together by thermo-compression.

In the embodiment, the method of compressing a conductive sheet on each side of the substrate 10 may include following steps: disposing the connecting layer 40 on each side of the substrate 10, then arranging a conductive sheet on the side of each connecting layer 40 away from the substrate 10, and integrating the substrate 10, the connection layers 40 and the conductive plates by thermo-compression such that each conductive plate may be fixed on one side of the substrate 10 by the corresponding connection layer 40. In the process of thermo-compression, the connecting layer 40 can be melted so that each conductive sheet may be adhered to one side of the substrate 10 by the melted connecting layer 40. At the same time, the connecting layer 40 can also insulate the magnetic core 16 from the conductive sheets on both sides of the substrate 10 to prevent the electric connection between the magnetic core 16 and the conductive sheets. The connecting layer 40 can be made of insulating adhesive material or material with a dielectric loss less than 0.02.

The block S30 of compressing a conductive sheet on each side of the substrate 10 may include following operations.

At block S32, a connecting layer 40 is arranged between each conductive sheets and the substrate 10.

In this block, each conductive sheet and the corresponding connecting layer 40 can constitute a conductive unit, that is, the method in the embodiment can also include the operation that a conductive unit is arranged on each side of the substrate 10. In one embodiment, the connecting layer is a solid connecting sheet, and the connecting sheet and the conductive sheet are successively stacked on the substrate. The conductive sheet can be pasted to the at least one substrate 10 after the connecting sheet forming the connecting layer 40. Certainly, in other embodiments, the connecting layer can alternatively be liquid, and is arranged between the conductive sheet and the substrate by coating or other means.

The dielectric loss of at least one connection layer 40 may be less than or equal to 0.02 such that the transmission loss of the signal transmitting in each transmission wire layer may be reduced, and the signal transmission efficiency in the transmission wire layer may be improved. The material of the connection layer 40 may have high magnetic transmission speed and low magnetic loss, e.g., organic resin. For example, the material of the connection layer 40 can be the material of the model TU863F or TU872SLK made by Taiwan Union Technology Corporation, model M4 or M6 made by Panasonic Industrial Devices Materials, MW1000 made by Nelco Company or the model EM285 made by Elite Material Co., Ltd.

At block S40, inner through holes 13 extending through the substrate 10 and the two conductive sheets and corresponding to the location of the central part 12 are formed, and outer through holes 15 extending through the substrate 10 and the two conductive sheets and corresponding to the location of the peripheral part 14 are formed.

After the two conductive sheets on the two sides of the substrate 10, it is required to form the inner through holes 13 at the central part 12 of the at substrate 10 and the outer through holes 15 at the peripheral part 14 of the at least one substrate 10. The inner through holes 13 and the outer through holes 15 penetrate the substrate 10 and two conductive sheets. The inner through holes 13 and the outer through holes 15 may run through the substrate 10 and the two conductive sheets.

At block S50, each conductive sheet is transformed into a transmission wire layer which includes a plurality of conductive wire patterns 22, and a conductive connector 17 is respectively arranged in each inner through hole 13 and each outer through hole 15. The plurality of conductive wire patterns 22 are spaced from each and arranged along the circumferential direction of the annular accommodating groove 18, and each conductive wire pattern 22 may bridge one inner through hole 13 and one corresponding outer through hole 15. All the conductive connectors 17 in the inner through holes 13 and the conductive connectors 17 in the outer through holes 15 may in order connect the corresponding conductive wire patterns 22 of the two transmission wire layers 30 to form coil circuits capable of transmitting current around the magnetic core 16. The conductive connector 17 can be made based on any method described above.

After finishing the arrangement of the inner through holes 13 and the outer through holes 15, the conductive wire pattern 22 may be made. That is, the two conductive sheets may each be formed into a plurality of conductive wire patterns. The method of forming the conductive wire patterns 22 may be etching the two conductive sheets to transform the two conductive sheets into a plurality of conductive wire patterns 22 which may bridge one inner through hole 13 and one corresponding outer through hole 15. Thus, the two conductive sheets may respectively form the first transmission wire layer 20 and the second transmission wire layer 30 both including the plurality of conductive wire patterns 22. In some embodiments, a connecting layer 40 may be arranged between each conductive sheet and the substrate 10. At this circumstance, after the transmission wire layers have been formed by etching, each transmission wire layer and the corresponding connecting layer 40, i.e., the conductive sheet and the adjacent connecting layer 40 located at the side of the conductive sheet, may constitute a transmission unit. Specifically, the transmission unit may be set on each side of the substrate 10 along the axial direction of the inner through hole 13. The dielectric loss of the connecting layer 40 between at least one conductive layer of the two transmission units and the substrate 10 may be less than or equal to 0.02.

Alternatively, one transmission unit may be arranged on one side of the substrate 10 along the axial direction of the inner through hole 13, and two adjacent transmission units may be arranged on the opposite side of the substrate 10. The dielectric loss of the connecting layer 40 between the two adjacent transmission units may be less than or equal to 0.02.

The dielectric loss of the connection layer 40 in each transmission unit may be less than or equal to 0.02, such that the signal transmission loss in each transmission wire layer of each transmission unit maybe reduced. Thus, the transmission efficiency of the transmission wire layer can be improved.

The specific method for transforming the conductive sheet into the conductive wire patterns 22 may include the following operations. Firstly, a masking layer covering a portion of the conductive sheet corresponding to the conductive wire patterns 22 to be formed may be set by exposing and developing. Then the conductive sheet may be etched such that a portion of the the conductive sheet which is not covered by the masking layer may be dissolved. After the etching is completing, the substrate 10 may be washed and the etching solution on the surface may be removed, and then a plurality of conductive wire patterns 22 on the two conductive sheets may be obtained after removing the masking layer. That is, the first transmission wire layer 20 and the second transmission wire layer 30 each including the plurality of conductive wire patterns 22 may be formed.

The conductive wire patterns 22 can also include input lines and coupling lines. The input lines and coupling lines can be arranged either in the same layer or in different layers as described above. Therefore, in the embodiment, the coupling effect of transformer 110 can be improved by reasonably arranging the input lines 222 and coupling lines 224. When the input lines 222 and coupling lines 224 are arranged in different layers, the space for arranging the input lines 222 and coupling lines 224 may be increased so that the width of both the input lines 222 and coupling lines 224 can be increased. Thus, the over current capacity of the whole transformer 110 may be improved.

Figure 11:
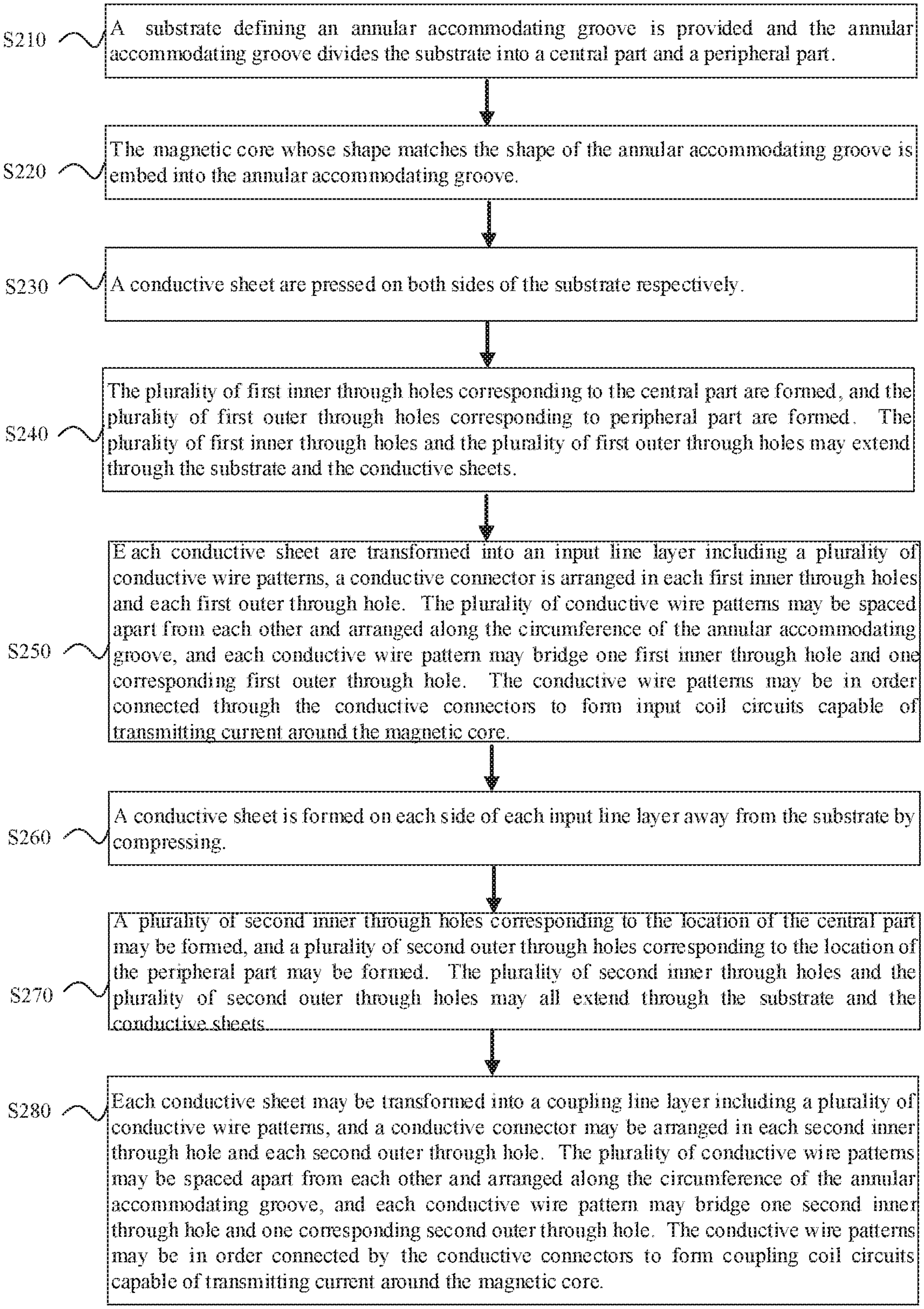
FIG. 11 is a flow chart of a method for making a transformer according to another embodiment of the present disclosure.

In the above embodiment, one conductive sheet may be arranged on each side of the substrate 10 to form one transmission wire layer. In other embodiments, one input line layer and one coupling line layer may be arranged on each side of the substrate 10. Specifically, referring to FIG. 11, in the embodiment, operations at block S210, block S220 and block S230 may be the same as the method of arranging only one transmission wire layer. Detailed information may be found in above-described embodiment and will not be described hereon. In this embodiment, the method may further include the following operations at blocks.

At block S240, the plurality of first inner through holes 132 corresponding to the central part 12 are formed, and the plurality of first outer through holes 134 corresponding to peripheral part 14 are formed. The plurality of first inner through holes 132 and the plurality of first outer through holes 134 may extend through the substrate 10 and the conductive sheets.

After setting the two conductive sheets on both side of the substrate 10, the first inner through holes 132 may be formed corresponding to the location of the central part 12 of the substrate 10 and the first outer through holes 152 may be formed corresponding to the location of the peripheral part 14. The first inner through holes 132 and the first outer through holes 152 may all pass through the substrate 10 and two conductive sheets.

At block S250, each conductive sheet are transformed into an input line layer including a plurality of conductive wire patterns 22, a conductive connector 17 is arranged in each first inner through holes 132 and each first outer through hole 152. The plurality of conductive wire patterns 22 may be spaced apart from each other and arranged along the circumference of the annular accommodating groove 18, and each conductive wire pattern 22 may bridge one first inner through hole 132 and one corresponding first outer through hole 15. The conductive wire patterns 22 may be in order connected through the conductive connectors 17 to form input coil circuits capable of transmitting current around the magnetic core 16.

After the first inner through holes 132 and the first outer through holes 152 are formed, the conductive wire patterns 22 may be then made. That is, the two conductive sheets may be formed into the conductive wire patterns 22 to form input coil circuits. The method for arranging the conductive wire patterns 22 is the same as that of the above-described embodiment and will not be described hereon.

At block S260, a conductive sheet is formed on each side of each input line layer away from the substrate 10 by compressing.

In this block, a conductive sheet may be further provide on the input line layers on two sides of the substrate 10 by compressing. Detailed information for compressing may be found in above-described embodiments.

At block S270, a plurality of second inner through holes 134 corresponding to the location of the central part 12 may be formed, and a plurality of second outer through holes 154 corresponding to the location of the peripheral part 14 may be formed. The plurality of second inner through holes 134 and the plurality of second outer through holes 154 may all extend through the substrate 10 and the conductive sheets.

At block S280, each conductive sheet may be transformed into a coupling line layer including a plurality of conductive wire patterns 22, and a conductive connector 17 may be arranged in each second inner through hole 134 and each second outer through hole 154. The plurality of conductive wire patterns 22 may be spaced apart from each other and arranged along the circumference of the annular accommodating groove 18, and each conductive wire pattern 22 may bridge one second inner through hole 134 and one corresponding second outer through hole 154. The conductive wire patterns 22 may be in order connected by the conductive connectors 17 to form coupling coil circuits capable of transmitting current around the magnetic core 16.

Figure 12:
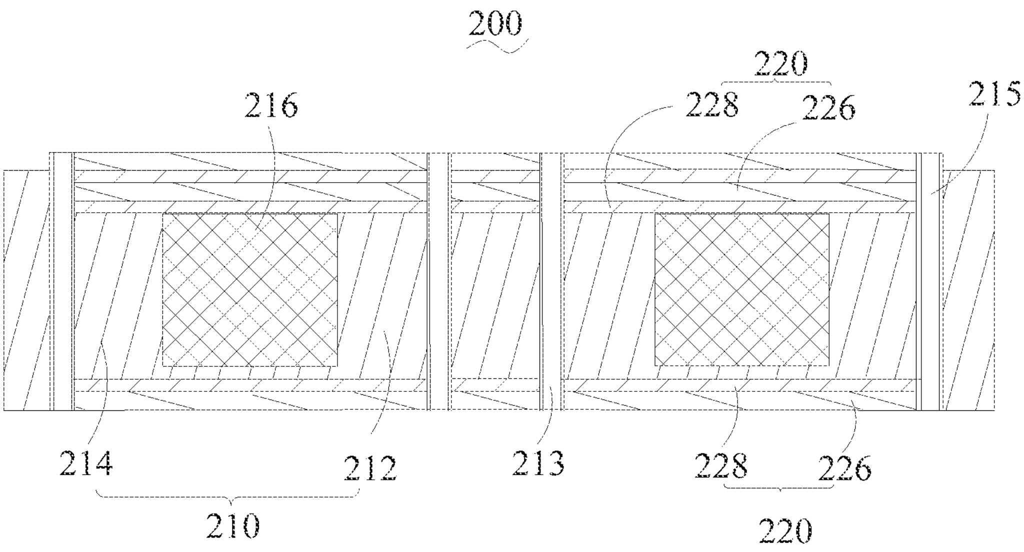
FIG. 12 is a schematic diagram of an electromagnetic element according to one embodiment of the present disclosure.

An electromagnetic device 200 is also provided by the present disclosure. The electromagnetic device 200 may be an inductor, a filter, or the transformer as described above. As shown in FIG. 12, the electromagnetic device 200 of any type may generally include a substrate 210, a magnetic core 216, and at least one transmission unit 220 arranged on each side of the substrate 210. The transmission unit 220 may include a transmission wire layer 226 composed of a plurality of wires arranged around the magnetic core 216 to form a coil, and a connecting layer 228 connected between the transmission wire layer 226 and the substrate 210. The connecting layer 228 may be made of a material with a dielectric loss less than or equal to 0.02. In the embodiment, two transmission units 220 may be arranged on one side of the substrate 210 and one transmission unit 220 is arranged on the opposite side of the substrate 210.

The difference is that when the plurality of conductive wire patterns include input lines and coupling lines, the electromagnetic device 200 can be a transformer. When the plurality of conductive wire patterns form a group of coils arranged surrounding the magnetic core 216, the electromagnetic device 200 may form an inductor. When the plurality of conductive wire patterns form two groups of coils arranged surrounding the magnetic core 216, the electromagnetic device 200 can be a filter. The specific structure of the electromagnetic device 200 as a transformer has been described above and will not be repeated hereon.

Figure 14:
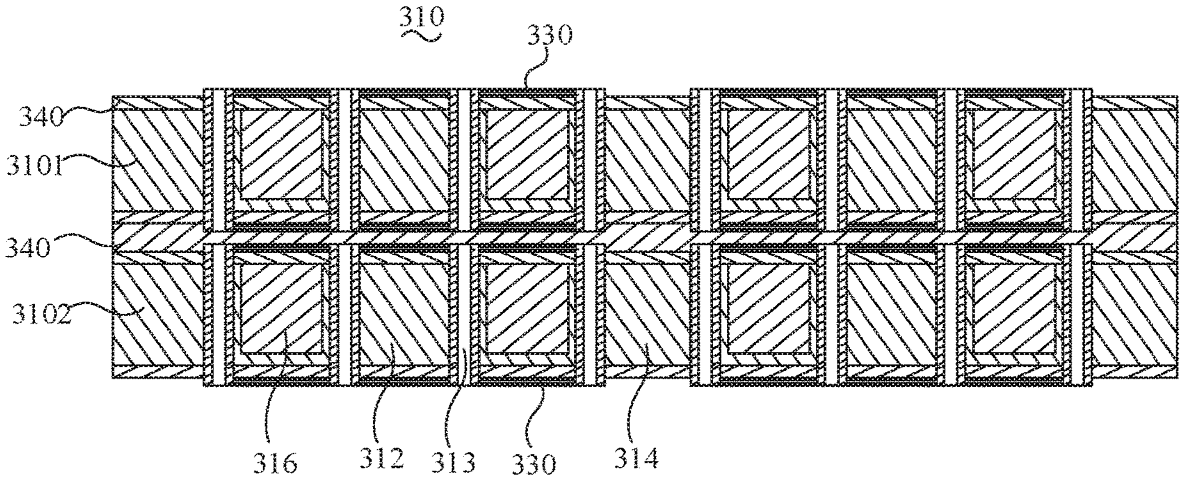
FIG. 14 is a schematic diagram of an integrated transformer containing a plurality of substrates according to one embodiment of the present disclosure.

Furthermore, referring to FIG. 13 and FIG. 14, an integrated transformer 300 based on the above transformer 110 is also provided by the present disclosure. The integrated transformer 300 may include at least one substrate 310. The substrate 310 may be the same as the substrate 10 described in the above embodiment (as shown in FIG. 1, FIG. 2 or FIG. 3), but the size of the substrate 310 is larger and can be used to form a plurality of transformers 110 and filters 120.

As shown in FIG. 13 and FIG. 14, each substrate 310 may define a plurality of annular accommodating grooves each corresponding to one transformer 110 or one filter 120. The substrate 310 may be divided into a plurality of central parts 312 and a peripheral part 314. Each central part 312 is surrounded by the annular accommodating groove and the peripheral part 314 is arranged around the annular accommodating groove. The structure of each transformer 110 and each filter 120 is the same as that of the transformer 110 described above, i.e., including a central part, a peripheral part, a magnetic core embedded in the annular accommodating groove, and the transmission wire layers on the two opposite sides of each substrate 310. The structure of these elements may be similar as those described above and will not be repeated hereon. Therefore, the plurality of central parts and the corresponding peripheral parts of the substrate, the plurality of magnetic cores, and the transmission wire layers on the two opposite sides of the substrate may constitute the plurality of transformers 110 and the plurality of filters 120 based on predetermined arrangement. At least one transformer 110 and at least one filter 120 may be electrically connected to form an electromagnetic assembly 320.

In one embodiment, referring to FIG. 13, the integrated transformer 300 can only include one substrate 310 on which four groups of electromagnetic assemblies 320 are arranged. All the transformers 110 and all the filters 120 in each group of electromagnetic assemblies 320 may be electrically connected, and each group of electromagnetic assemblies 320 are not electrically connected with each other.

Referring to FIG. 13, in the embodiment, each group of electromagnetic assemblies 320 may include one transformer 110 and one filter 120. In this case, the transformer 110 and the filter 120 in each group of electromagnetic assemblies 320 may be electrically connected with the filter 120, and the transformer 110 and filter 120 in different groups of electromagnetic assemblies may not be electrically connected with each other.

Figure 23:
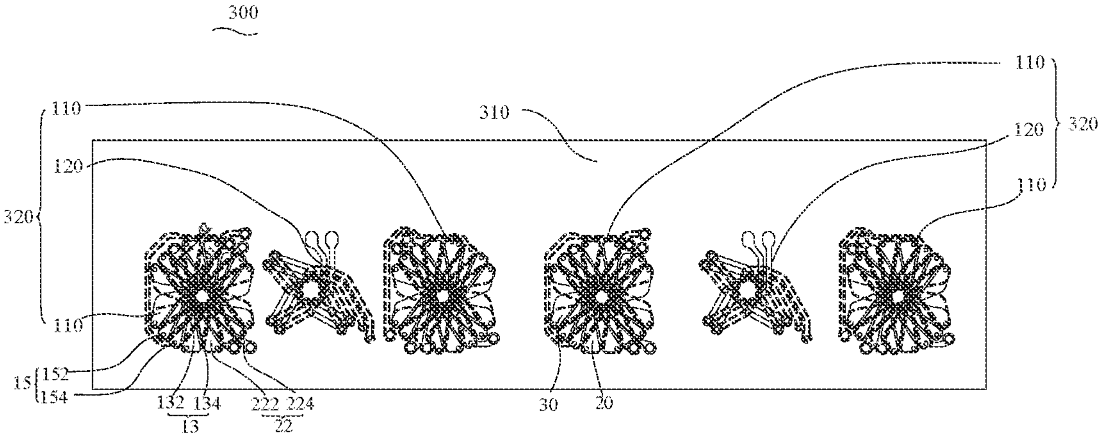
FIG. 23 is a plan view of an integrated transformer including filters and transformers installed in the same layer according to another embodiment of the present disclosure.

In another embodiment, referring to FIG. 23, each group of electromagnetic assemblies 320 may include two transformers 110 and one filter 120. The filter 120 may be connected between the two transformers 110. In this case, the two transformers 110 and the filter 120 in a same group of electromagnetic assemblies may be electrically connected. The transformers 110 and the filter 120 in different groups of electromagnetic assemblies may be not connected with each other.

In another embodiment, the integrated transformer 300 may include a plurality of substrates 310. For example, in the embodiment, referring to FIG. 13, the integrated transformer 300 may include three substrates 310, and the a plurality of substrates 310 may be stacked together along the axial direction of the inner through holes 313. A plurality of transformers 110 and a plurality of filters 120 may be formed on each substrate 310. At least one transformer 110 and at least one filter 120 may be electrically connected to form a group of electromagnetic assemblies 320. All transformers 110 and all filters 120 in each group of electromagnetic assemblies 320 formed on a same substrate 310 may be electrically connected, and the transformers 110 and the filter 120 in different groups of electromagnetic assemblies 320 may not be connected with each other.

In the embodiment, the arrangement of each group of electromagnetic assemblies 320 may be similar to that in the above embodiment and will not be repeated hereon.

In the above mentioned embodiment, the transformers 110 and the filters 120 may be arranged in a same layer. Alternatively, in other embodiments, the transformers 110 and the filters 120 may also be arranged in different layers. In one embodiment, the integrated transformer 300 may include at least two substrates 310 stacked together. The at least two substrates 310 may include at least one first substrate 3101 and at least one second substrate 3102. The first substrate 3101 and the second substrate 3102 may be similar to the substrate 10 described in the above embodiments (as shown in FIGS. 1-3). The difference is that the sizes of the first substrate 3101 and the second substrate 3102 may be larger. Thus, the first substrate 3101 and the second substrate 3102 can each define a plurality of annular accommodating grooves used for accommodating magnetic cores corresponding to the plurality of transformers or the plurality of filters. On the first substrate 3101 may be formed only the plurality of transformers 110 while on the second substrate 3102 may be formed only the plurality of filters.

Specifically, the first substrate 3101 may define a plurality of annular accommodating grooves which are in one-to-one correspondence to the transformers 110. The first substrate 3101 may be divided into a plurality of central parts surrounded by one annular accommodating groove and a peripheral part 314 surrounding the annular accommodating grooves. The structure of each transformer 110 may be the same as that of the above-described transformer 110. That is, each transformer 110 may include the central part, the peripheral part, the magnetic core embedded in the annular accommodating groove, and two transmission wire layers located at the two opposite sides of the first substrate 3101. These structure of these elements may be similar to those described above and will not be repeated hereon. Through this way, a plurality of transformers 110 on each first substrate 3101 can be formed.

Similarly, the second substrate 3102 may define a plurality of annular accommodating grooves which are in one-to-one correspondence to the filter 120. The second substrate 3102 may be divided into a plurality of central part 312 each surrounded by one corresponding annular accommodating groove and a peripheral part 314 surrounding the annular accommodating grooves. The structure of each filter 120 may be similar to that of the above-described transformer 110. That is, the filter 120 may include the central part, the peripheral part, the magnetic core embedded in the annular accommodating groove, and two transmission wire layers located at the two opposite sides of the second substrate 3102. The structure of these elements may be similar to those described above and will not be repeated hereon. Through this way, a plurality of filters 120 on each second substrate 3102 can be formed.

When there area plurality of substrates 310, in one embodiment, the plurality of first substrates 3101 arranged with transformers 110 and the plurality of second substrates 3102 arranged with filters 120 may be alternately arranged. That is, the transformers 110 and the filters 120 in the integrated transformer 300 may be located at different layers, and at least one transformer 110 and at least one filter 120 located respectively on two adjacent substrates 3101 and 3102 may constitute a group of electromagnetic assemblies. For example, at least one transformer 110 on the first substrate 3101 and at least one filter 120 on the second substrate 3102 can constitute a group of electromagnetic assemblies. All the transformers 110 and the filters 120 in each group of electromagnetic assemblies may be electrically connected, and different groups of electromagnetic assemblies are not electrically connected with each other.

In another embodiment, a plurality of first substrates 3101 arranged with transformers 110 can be firstly stacked together, and then a plurality of second substrates 3102 arranged with filters 120 may be stacked on the plurality of first substrates 3101.

A plurality of transformers 110 may be formed on the first substrate 3101. That is, the plurality of transformers 110 may share one first substrate 3101. In this situation, the first substrate 3101 together with the plurality of transformers 110 can also be called a transformer layer. A plurality of filters 120 may be formed on the second substrate 3102. That is, the plurality of filters 120 may share one second substrate 3102. In this situation, the second substrate 3102 together with the plurality of transformers 110 can also be called a filter layer.

The electrical connection between one transformer of the transformer layer and one corresponding filter of the filter layer can be realized by a conductive through hole and a conductive connector in the conductive through hole. The conductive through hole and the conductive connector may both pass through the transformer layer and the filter layer.

In addition, the electrical connection between one transformer and one corresponding filter can also be realized by a conductive blind hole and a conductive connector in the conductive blind hole. The conductive blind hole may extend from the transmission wire layer on the side of the transformer away from the filter layer to the transmission wire layer on the side of the filter layer close to the transformer layer. Alternatively, the conductive blind hole can also extend from the transmission wire layer on the side of the filter layer away from the transformer layer to the transmission wire layer on the side of transformer layer close to the filter. Furthermore, the electrical connection between the transformer and the filter may be achieved under the cooperation of the conductive through hole (or conductive blind hole) and the conductive wire patterns of the transmission wire layer connected with the conductive through hole (or conductive blind hole).

Figure 15:
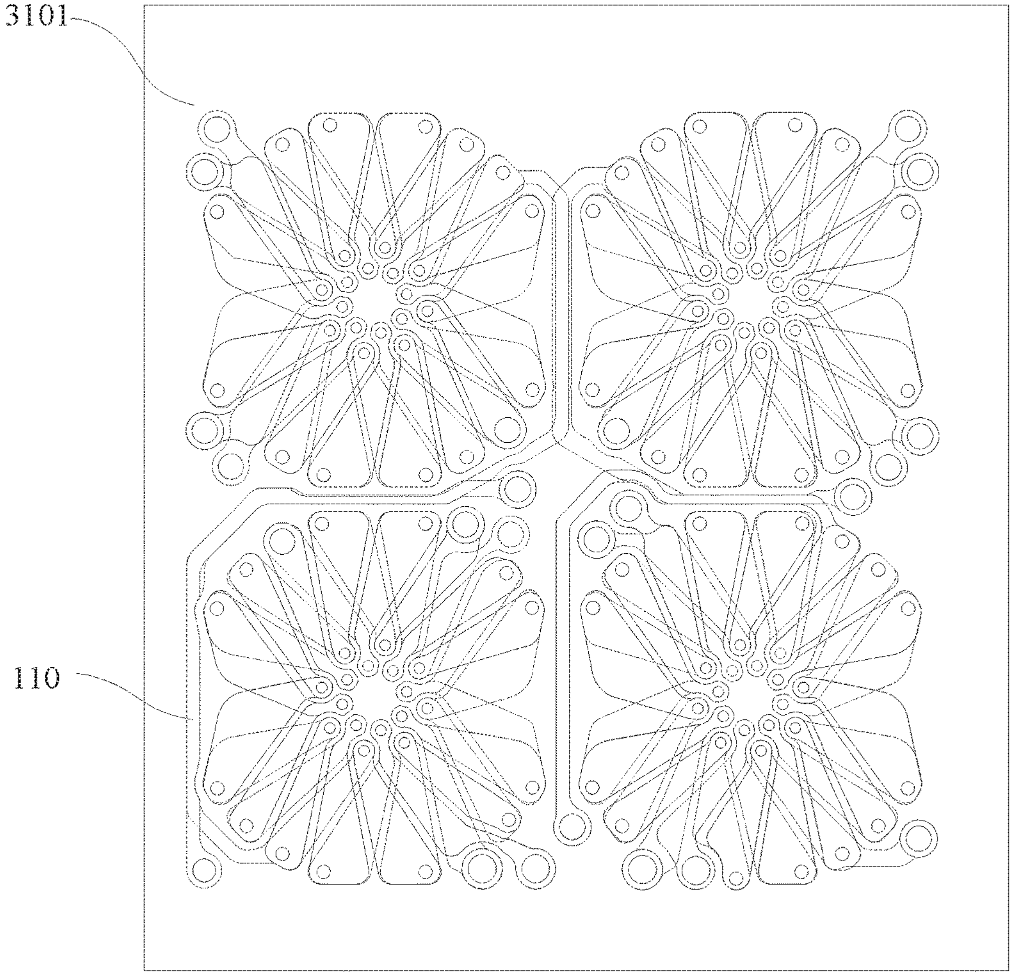
FIG. 15 is a plan view of a transformer layer of an integrated transformer including filters and transformers disposed in different layers according to one embodiment of the present disclosure.
Figure 16:
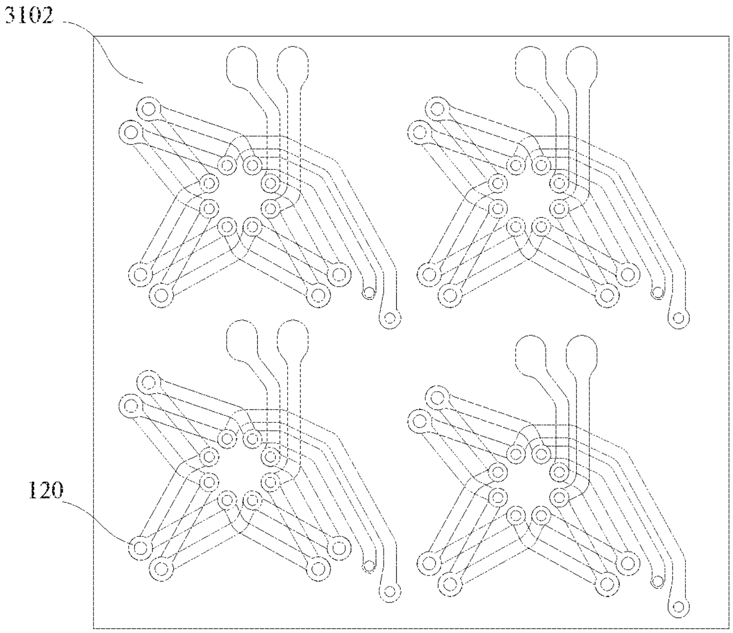
FIG. 16 is a plan view of a filter layer of an integrated transformer including a filter and a transformer disposed in different layers according to one embodiment of the present disclosure.

Referring to FIGS. 14-16, in one embodiment, the integrated transformer 300 may include two substrates 310 including the first substrate 3101 and the second substrate 3102. Four transformers 110 are formed on the first substrate 3101 (as shown in FIG. 15), and four filters 120 are formed on the second substrate 3102 (as shown in FIG. 16). In the embodiment, the structure of each transformer 110 and each filter 120 may be similar to those described above and will not be repeated hereon.

Furthermore, the integrated transformer 300 can also include a plurality of substrates 310. First example, the substrates 310 can include at least three layers, and the plurality of substrates may be stacked together. The arrangement of the integrated transformer 300 with the plurality of substrates may be similar to that of the plurality of substrates described above. The difference is that, in the embodiment, on each substrate, there may be formed either only transformers or only filters 120.

For network transformer, the transformer should have a larger inductance value, thus, the volume of the magnetic core of the transformer is usually larger than that of the magnetic core of the filter. That is, the height of the magnetic core of the transformer is generally larger than that of magnetic core of the filter. For example, in the plurality of structures, there are one or more transformers in each substrate, which will increase the total height of the integrated transformer. In the embodiment, the transformers and the filters may be arranged in different layers. Thus, in the embodiment, the thickness of the substrate shared by the filters smaller than the thickness of the substrate shared by the transformers. Therefore, compared with the structure that the transformers and the filters share s common substrate, implementation of the embodiment may make the structure of the integrated transformer 300 more compact. In addition, the thickness of the transmission wire layer of the filter 120 can be smaller than that of the transmission wire layer of the transformer 110. Therefore, when the substrates are stacked together, the structure that the filter 120 and the transformer 110 are arranged in different layers may have a smaller thickness than the structure that the filter 120 and the transformer 110 are arranged in a same layer. Accordingly, the compactness of the structure of the integrated transformer may be further improved.

In the embodiment, still referring to FIG. 13, connection layers 340 may be arranged between the first substrate 3101 and the transmission wire layer 330 arranged on each side of the first substrate 3101, and between the second substrate 3102 and the transmission wire layer 330 arranged on each side of the second substrate 3102. The dielectric loss of at least one of the connecting layers 340 may be less than or equal to 0.02.

By controlling the dielectric loss of the connection layer 340 less than or equal to 0.02, the signal loss can be reduced when the transmission wire layer 330 is transmitting signal. Thus the signal transmission efficiency can be improved.

Figure 17:
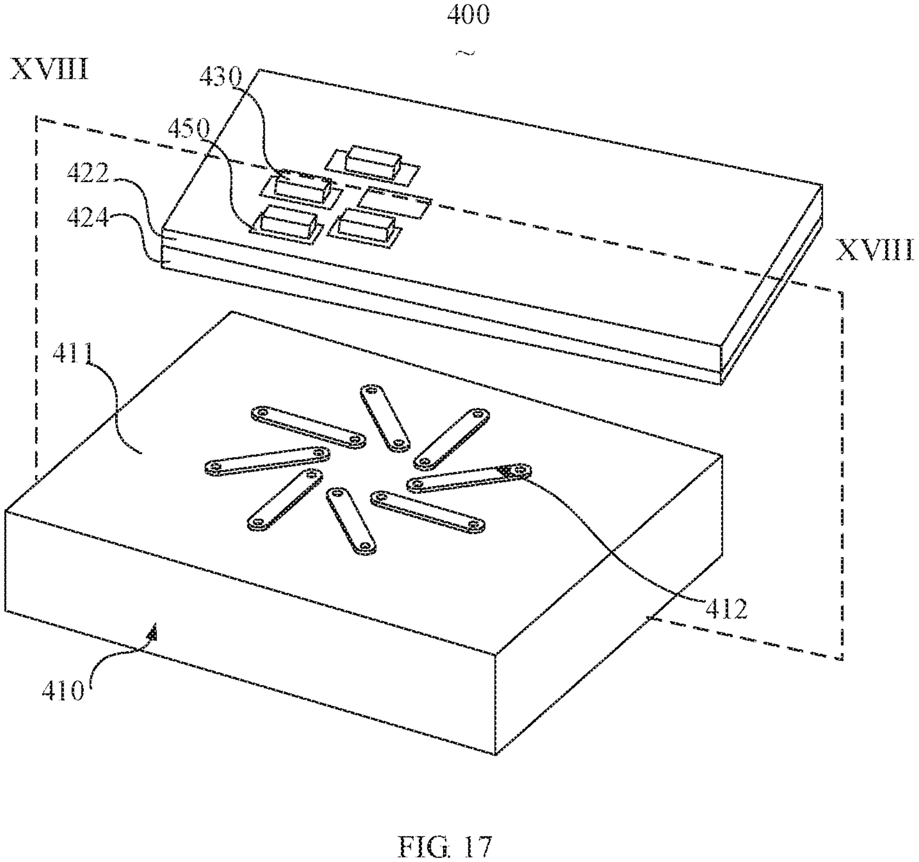
FIG. 17 is a schematic diagram of an electromagnetic device according to one embodiment of the present disclosure.

Furthermore, an electromagnetic device 400 is provided by the present disclosure. As shown in FIG. 17, the electromagnetic device 400 may include an electromagnetic element 410 and a composite layer 420 arranged on the surface of the electromagnetic element 410. The electromagnetic element 410 can be an inductor, a transformer or a filter. In the embodiment, the electromagnetic element 410 is a transformer. The structure of the electromagnetic element 410 may be similar to the transformer or the filter described in the above embodiments, and will not be repeated hereon.

Figure 18:
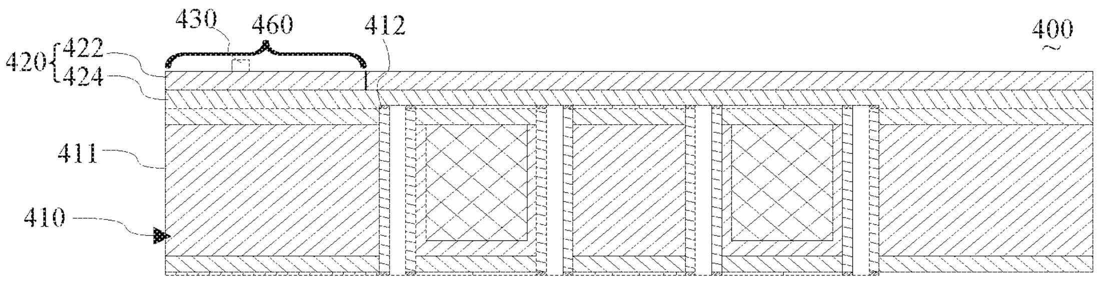
FIG. 18 is a cross section view of the electromagnetic device of FIG. 17, taken along a line XVIII-XVIII thereof.

As shown in FIGS. 17 and 18, the composite layer 420 may be arranged on a side of the transmission wire layer 412 of the electromagnetic element 410 farthest away from the at least one substrate 411. The composite layer 420 may be used to set an electronic element 430 so that the electronic element 430 may be electrically connected with at least one transmission wire layer 412 adjacent to the composite layer 420.

Further referring to FIGS. 17 and 18, the composite layer 420 may include an adhesive layer 424 and a conductive layer 422. The adhesive layer 424 may be located between the conductive layer 422 and the corresponding transmission wire layer 412. The adhesive layer 424 may be used to fix the conductive layer 422 on the transmission wire layer 412 of the electromagnetic element 410, and to separate the conductive layer 422 from the transmission wire layer 412 to prevent short circuits. The electronic element 430 may be attached to the conductive layer 422.

Specifically, in one embodiment, the electronic element 430 may include lead-out terminals (not shown). The conductive layer 422 may include an element connecting part 450 which is used to fix the lead-out terminals of the electronic element 430. In addition, the conductive layer 422 may further include a conductive connecting line (not shown), and the conductive layer 422 may define a plurality of first conductive holes (not shown) therein. The conductive connecting line may electrically connect the first conductive hole and the element connecting part 450. Each first conductive hole may extend from the conductive layer 422 to at least one transmission wire layer.

In the embodiment, the element connecting part 450 may be a weld plate or a connecting finger, and the lead-out terminals of the electronic element 430 may be fixed on one side of the element connecting part 450 away from the adhesive layer 424.

In another embodiment, the element connecting part 450 may also be the second conductive hole extending from the conductive layer 422 to at least one transmission wire layer. The lead-out terminals of each electronic element 430 may be inserted into the corresponding second conductive hole and electrically connected with the inner wall of the corresponding second conductive hole. In one embodiment, a conductive connector may be utilized to fixedly connect each lead-out terminal and the inner wall of the second conductive hole. In another embodiment, each lead-out terminal and the inner wall of the corresponding second conductive hole can be mutually abutted.

Furthermore, in other embodiments, the electromagnetic device 400 may also include an electromagnetic element 410, a composite layer 420 arranged on the electromagnetic element 410, and an electronic element 430 arranged on the composite layer 420 and electrically connected with the electromagnetic element 410. The specific structures of the electromagnetic element 410, the composite layer 420 and the electronic element 430 may be similar to those described in above embodiments and will not be repeated hereon. The number of the electronic elements 430 can be one or more, and the electronic element 430 may be a capacitor, a resistor and the like.

The electronic element 430 and the composite layer 420 can form a filter circuit together. Specifically, the electromagnetic device 400 may also include a grounding terminal, and a connecting wire arranged on the composite layer 420. The electronic element 430 may include a capacitor and a resistor. One end of the capacitor may electrically connect with one end of the resistor through the connecting wire. The other end of the capacitor may connect with the grounding terminal, and the other end of the resistor may be electrically connected with the coupling line layer in the electromagnetic element 410.

Furthermore, the electromagnetic device 400 may also include a plurality of electronic elements 430 arranged on the composite layer 420. The electronic element 430 may include but not limit to capacitor, resistor and inductor. In addition, the plurality of electronic elements 430 can be connected with each other to form a circuit with certain functions, such as a filter circuit, etc. When the plurality of electronic elements 430 are connected and form a filter circuit, the interference signal in the signal processed by the transformer can be filtered out. Thus the performance of the integrated electromagnetic device 400 can be improved.

In the embodiment, in order to protect the conductive wire patterns of the transmission wire layer 412 and to protect the conductive wire patterns of the transmission wire layer 412 from short circuit with other elements, an insulating layer (not shown) may be arranged on the side of the transmission wire layer 412 away from the substrate 411. In the embodiment, the insulating layer may be arranged on the surface of the composite layer. The insulating layer can be a coating layer of polyimide (PI) or ink.

Figure 19:
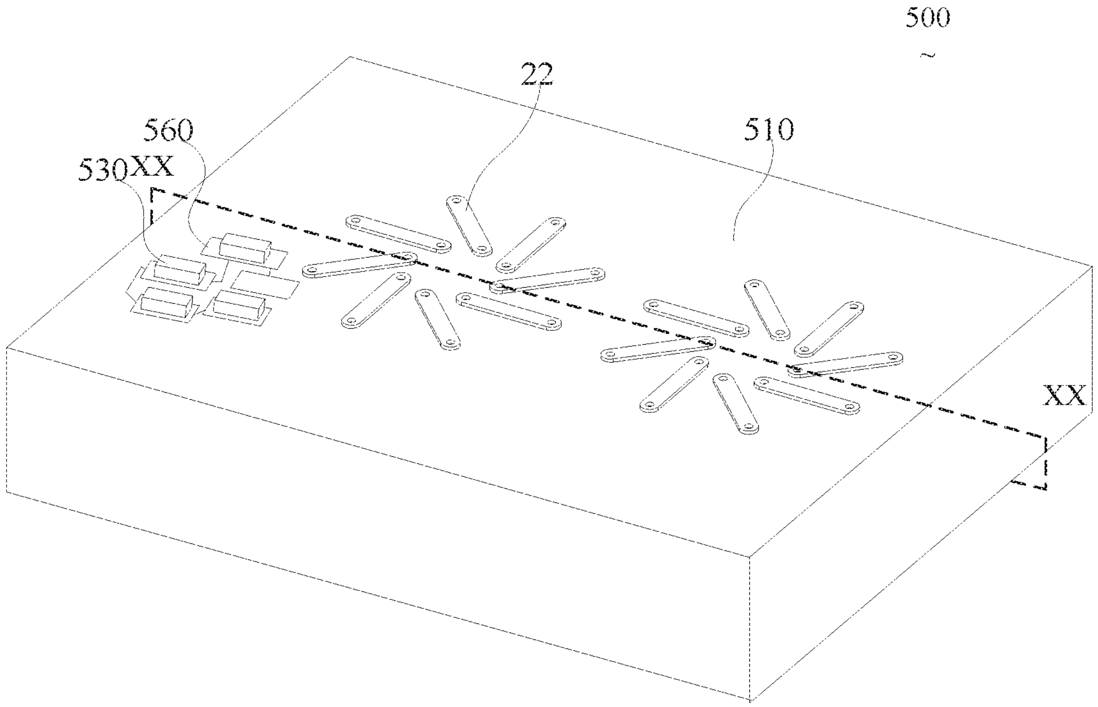
FIG. 19 is a schematic diagram of an electromagnetic device according to another embodiment of the present disclosure.
Figure 20:
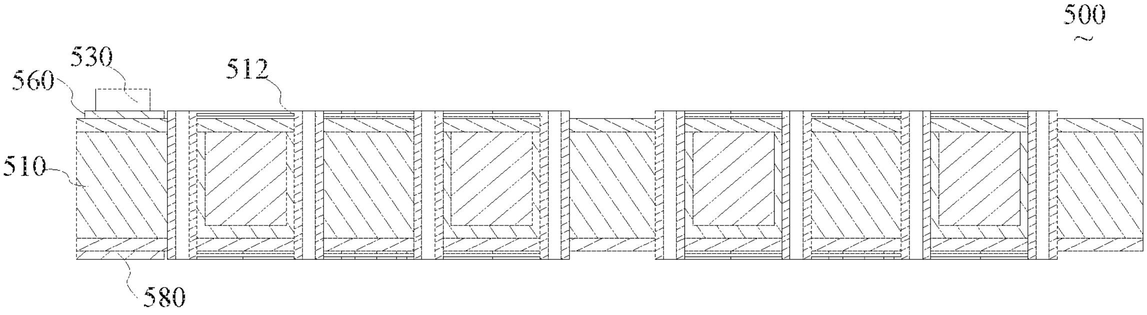
FIG. 20 is a cross section view of the electromagnetic device of FIG. 19, taken along a line XX-XX thereof.

In the embodiment, the composite layer 420 may be set on a side of the transmission wire layer 412 away from the substrate 411, and the electronic element 430 may be arranged on the composite layer 420. In other embodiments, a bonding layer instead of the composite layer may be directly arranged on one side of the substrate where the transmission wire layer is disposed, and the electronic element 430 may be directly connected to the bonding layer. The term "directly" here means that the electronic element 430 is connected to the bonding layer without the any other intermediate medium. Actually, the electronic element 430 may include lead-out terminals which may directly connect to the bonding layer. For example, in the embodiment shown in FIG. 19-20, a transmission wire layer 512 and a bonding layer 560 arranged in the same layer may be set on one side of the substrate 510 of an electromagnetic device 500. An electronic element 530 may directly connect to the bonding layer 560. The bonding layer 560 and the transmission wire layer 512 on one side of the bonding layer 560 may be arranged on the same layer and electrically connected, but the bonding layer 560 and the transmission wire layer 512 are not overlapped. That is, the bonding layer 560 can be electrically connected with the transmission wire layer 512 arranged in the same layer by, for example, a conductive connecting line. The term "not overlapped" does not exclude the use of wires to connect the bonding layer 560 and the transmission wire layer 512.

In other embodiments, the bonding layer 560 may also be electrically connected with the transmission wire layer 512 on the other side of the substrate 510. For example, conductive through holes may be formed on the bonding layer 560, and electrical connection between the bonding layer 560 and the transmission wire layer located at the opposite side of the substrate 510 may be realized by the conductive through holes.

In the embodiment, a fixing layer 580 may also be arranged on the transmission wire layer 512 on the side of the substrate 510 away from the bonding layer 560. The fixing layer 580 may be used to fix and electrically connect the electromagnetic device 500 to the outer circuit (not shown). In the embodiment, the fixing layer 580 can also be set at the same layer with, but not overlap the transmission wire layer 512 on the same side of the substrate 510. That is, the fixing layer 580 and the transmission wire layer 512 may be arranged at the same layer on one side of the substrate 510, and the fixing layer 580 is also electrically connected with the transmission wire layer 512 on the same side. The term "not overlap" does not exclude the use of wires to connect the fixing layer 580 and the transmission wire layer 512. The fixing layer 580 can be a weld plate for fixing the whole electromagnetic device 500 to a predetermined position. For example, the whole electromagnetic device 500 can be fixed to a circuit board through the fixing layer 580, so that the electromagnetic device 500 may be connected to the preset circuit on the circuit board.

Figure 21:
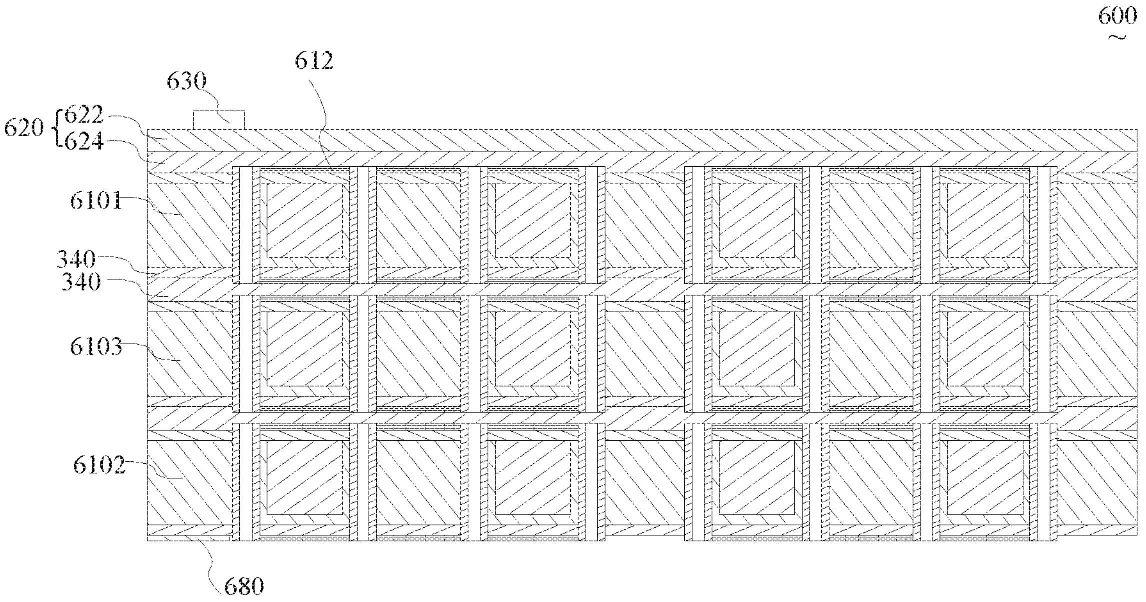
FIG. 21 is a cross section view of an integrated transformer according to one embodiment of the present disclosure.
Figure 22:
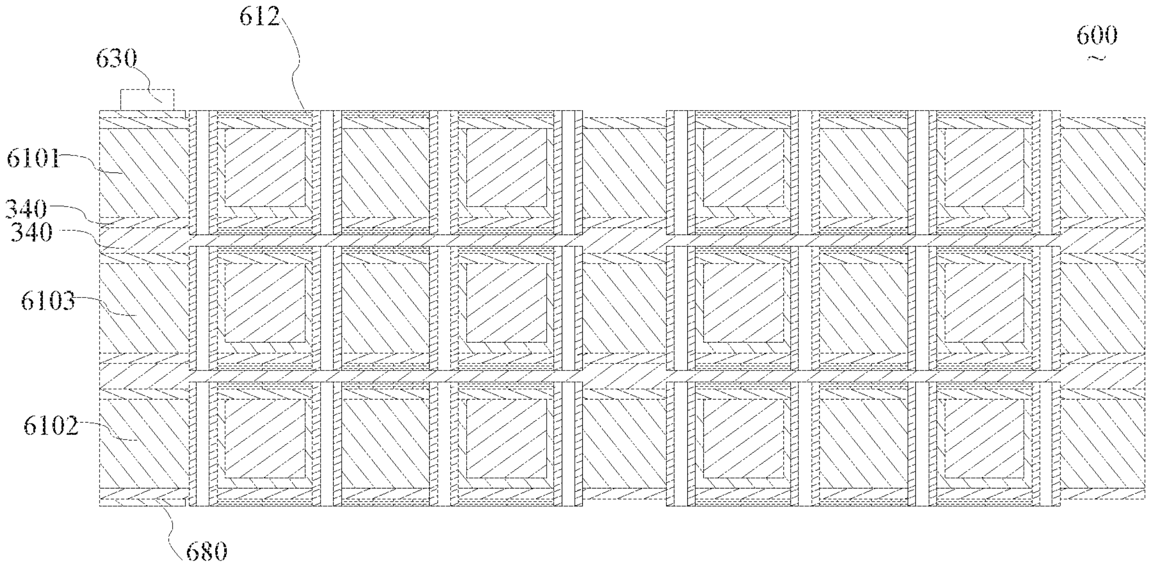
FIG. 22 is a cross section view of an integrated transformer according to another embodiment of the present disclosure.

Furthermore, an integrated transformer is also provided by the present disclosure. The integrated transformer can include any of the integrated transformers as above described. Referring to FIGS. 21-22, the difference between the integrated transformer 600 of the embodiment and the integrated transformer described above is that the integrated transformer 600 may include the composite layer (as shown in FIG. 21) as that used in the above described electromagnetic device 400 on which the electronic element may be disposed or the bonding layer (as shown in FIG. 22) as that used in the above described the electromagnetic device 500 on which the electronic element may be disposed. The arrangement of composite layer or bonding layer can be the same as the method mentioned above. Similarly, a fixing layer 680 can also be arranged on the integrated transformer 600 to fix and electrically connect the integrated transformer 600 to the external circuit.

In one embodiment, specifically, when the integrated transformer includes only one substrate, at least one transformer and at least one filter electrically connected with the at least one transformer may be arranged on the substrate. The specific arrangement of the transformer and the filter can be referred to FIG. 13. Two transmission wire layers may be respectively set on the two opposite sides of the substrate. A bonding layer may be disposed in a same layer as one of the transmission wire layers, or a composite layer may be arranged on a side of this transmission wire layer away from the substrate. Alternatively, a fixing layer may be set on the side of the substrate opposite to the bonding layer or the composite layer. The fixing layer may be configured to fix and electrically connect the integrated transformer to an external circuit. In addition, since the number of conductive wire patterns of the filter may be less than that of the transformer, both the bonding layer and the fixing layer can be set on one side of the substrate close to the filter. Thus the structure of the integrated transformer may be made compact.

In another embodiment, the integrated transformer 600 may include a plurality of substrates 610 stacked together in order. The electronic element 630 can connect to the integrated transformer 600 by adding a composite layer 620 on the side of the transmission wire layer away from the substrate, or by setting a bonding layer 660 on the substrate. Specifically, the bonding layer or composite layer may be arranged on the outermost substrate, while the fixing layer may be arranged on another substrate farthest away from the substrate with the bonding layer or composite layer, and on a side away from the bonding layer.

Referring to FIGS. 21 and 22, in the embodiment, specifically, the integrated transformer 600 may include three substrates 610 (i.e., a first substrate 6101, a second substrate 6102 and a third substrate 6103). The first substrate 6101, the third substrate 6103, and the second substrate 6102 may be stacked together along the axial direction of the inner through holes on one of the substrate and electrically connected. That is, the third substrate 6103 may be located between the first substrate 6101 and the second substrate 6102.

The composite layer 620 (referring to FIG. 21) or the bonding layer 660 (referring to FIG. 21) can be arranged on one side of the first substrate 6101 away from the third substrate 6103, and the fixing layer 680 can be arranged on one side of the second substrate 6102 away from the third substrate 6103. Alternatively, the composite layer 620 or the bonding layer 660 can be arranged on one side of the second substrate 6102 away from the third substrate 6103, and the fixing layer 680 can be arranged on one side of first substrate 6101 away from third substrate 6103.

In one embodiment, when at least one group of electromagnetic assemblies including transformers and filters can be formed on each layer of substrate 610. For example, as shown in FIGS. 21 and 22, when at least one group of electromagnetic assemblies including transformers and filters are disposed on each of the first substrate 6101, the second substrate 6102 and the third substrate 6103, the composite layer 620 or the bonding layer 660 may be arranged on the first substrate 6101 or the second substrate 6102.

When the transformers and the filters are respectively formed on different substrates, for example, when on some substrates 610 there may only be arranged transformers and on the other substrates 610 there may only be arranged filters, because the number of conductive wire patterns of the filter is less than the number of the conductive wire patterns of the transformer, the fixing layer can be arranged on the substrate on which the filters are formed, and the composite layer or bonding layer can be arranged on the substrate on which the transformers are formed. In this way, the structure of the integrated transformer may be more compact.

For example, in one embodiment, as shown in FIGS. 21 and 22, only transformers can be formed on the first substrate 6101, and only filters can be formed on the second substrate 6102. On the third substrate 6103 there may be formed only transformers, only filters, or both transformers and filters at the same time. At this time, in order to make the structure of the integrated transformer more compact, the composite layer 620 or the bonding layer 660 can be arranged on one side of the first substrate 6101 on which the transformers are formed away from the second substrate 6102, and the fixing layer 680 is arranged on the side of the second substrate 6102 on which the filters are formed away from the third substrate 6103. In the above embodiment, the electronic element may be directly attached on the bonding layer arranged in a same layer as the transmission wire layer or be arranged on one side of the composite layer located on the transmission wire layer and away from the substrate. Thus, on the one hand, the production and processing steps can be simplified and product yield can be improved, on the other hand, the integration level of electromagnetic devices can be increase and the use is more convenient.

The application also provides an electronic device, the electronic device may include an electromagnetic equipment, and the electromagnetic equipment may include at least one of the transformer, integrated transformer, electromagnetic element or electromagnetic device described in the above embodiment.

The above description is for the purpose of illustrating implementations of the present disclosure, but not to limit the scope of the present disclosure. Any equivalent structural or process transformation performed based on the drawings and the specification of the present disclosure, applied directly and indirectly in other related art, should be within the scope of the present disclosure.

What is claimed is:

1. An integrated transformer, comprising:

at least one substrate, wherein the at least one substrate defines a plurality of annular accommodating grooves, each annular accommodating groove divides a corresponding substrate into a central part surrounded by the each annular accommodating groove and a peripheral part arranged around the each annular accommodating groove, each central part defines a plurality of inner through holes therethrough, and each peripheral part defines a plurality of outer through holes therethrough; and a diameter of each of the plurality of inner through hole is about 1.5~ 3.1 mm;

a plurality of magnetic cores each accommodated in a respective one of the annular accommodating grooves;

a plurality of transmission wire layers, wherein on each of two opposite sides of the at least one substrate is arranged one of the transmission wire layers, each of the transmission wire layers comprises a plurality of conductive wire patterns spaced apart from each other and arranged along a circumferential direction of a corresponding one of the annular accommodating grooves, each of the conductive wire patterns bridges one of the inner through holes and one of the outer through holes; and a plurality of conductive connectors arranged in the inner through holes and the outer through holes, and configured to connect in order the conductive wire patterns on the two transmission wire layers on each of the at least one substrate to form a plurality of coil circuits capable of transmitting current around the magnetic core, wherein each of the plurality of coil circuits is located around a corresponding one of the plurality of magnetic cores;

wherein the central parts and the peripheral parts of the at least one substrate, the magnetic cores and the conductive connectors assembled on the at least one substrate, and the transmission wire layers on both sides of the at least one substrate cooperatively constitute a plurality of transformers and filters arranged according to preset arrangement manners, at least one of the transformers and at least one of the filters are electrically connected to form a group of electromagnetic assemblies, and any two groups of electromagnetic assemblies are not electrically connected with each other on the at least one substrate; and wherein the plurality of inner through holes comprise a plurality of first inner through holes and second inner through holes; a connecting line of centers of all the first inner through holes forms a first circular trajectory, and a connecting line of centers of all the second inner through holes forms a second circular trajectory; a center of the first circular trajectory and a center of the second circular trajectory coincides, a radius of the second circular trajectory is larger than a radius of the first circular trajectory, and distances between the center of each of the second inner through holes and the centers of two adjacent first inner through holes are equal;

the plurality of the outer through holes comprise a plurality of first outer through holes and second outer through holes; the plurality of conductive wire patterns of each of the transmission wire layers comprise a plurality of input lines and coupling lines; each of the input lines bridges one of the first inner through holes and one of the first outer through holes; and each of the coupling lines bridges one of the second inner through holes and one of the second outer through holes;

the input lines are divided into a plurality of input line groups, and the coupling lines are divided into a plurality of coupling line groups; each of the input line groups comprises at least one of the plurality of input lines, and each of the coupling line groups comprises at least one of the plurality of coupling lines;

each of the input line groups in the same one of the transmission wire layers comprises only one of the input lines, and each of the coupling line groups comprises only one of the coupling lines; in the same one of the transmission wire layers, each input line and each coupling line are alternately arranged along the circumferential direction of the magnetic cores.

2. The integrated transformer according to claim 1, wherein each group of electromagnetic assemblies comprises one transformer and one filter, and the one transformer is electrically connected with the one filter.

3. The integrated transformer according to claim 1, wherein each group of electromagnetic assemblies comprises two transformers and one filter, and the one filter is arranged between the two transformers, and the two transformers are electrically connected with the one filter.

4. The integrated transformer according to claim 1, wherein the at least one substrate comprises two substrates arranged along an axial direction of the inner through holes, and the integrated transformer further comprises:

a connecting layer located between the two substrates; and conductive holes extending through the two substrates and the connecting layer along the axial direction of the inner through holes and configured to electrically connect the two layers of the substrates.

5. The integrated transformer according to claim 1, wherein the at least one substrate comprises one substrate.

6. The integrated transformer according to claim 1, wherein widths of at least some of the conductive wire patterns in the transformer are gradually increased along a wiring direction from the inner through holes to the outer through holes such that a distance between at least some of adjacent ones of the conductive wire patterns is consistent within a projection area of the corresponding one of the plurality of annular accommodating grooves.

7. The integrated transformer according to claim 1, wherein each of the input line groups in the same one of the transmission wire layers comprises at least two consecutive input lines, and each of the coupling line groups comprises at least two consecutive coupling lines; in the same one of the transmission wire layers, an alternating arrangement manner of the input lines and the coupling lines is one input line, one input line, one coupling line, and one coupling line.

8. The integrated transformer according to claim 1, wherein each of the transmission wire layers comprises an input line layer and a coupling line layer, the input line layer and the coupling line layer are stacked together;

the input lines are located in the input line layer and are divided into a plurality of input line groups; the coupling lines are located in the coupling line layer and are divided into a plurality of coupling line groups;

projections of the input line groups of the input line layer on the at least one substrate and projections of the coupling line groups of the coupling line layer on the at least one substrate are alternately arranged along the circumferential direction of the magnetic cores.

9. The integrated transformer according to claim 1, wherein the number of the input lines is equal to the number of the coupling lines.

10. The integrated transformer according to claim 1, wherein the plurality of first inner through holes comprise first sub inner through holes and second inner through holes, a connecting line of all centers of the first sub inner through holes forms a first annular trajectory, a connecting line of all centers of the second sub inner through holes forms a second annular trajectory, and connecting line of centers of all the second inner through holes forms a third annular trajectory; and centers of the first annular trajectory, the second annular trajectory and the third annular trajectory coincide, and the second annular trajectory is located between the first annular trajectory and the third annular trajectory.

11. The integrated transformer according to claim 10, wherein distances between the center of each second sub inner through hole and the centers of two adjacent first sub inner through hole are equal, and distances between the center of each second inner through hole and the centers of two adjacent second sub inner through holes are equal.

12. An electronic device, comprising at least one integrated transformer, wherein the at least one integrated transformer comprises:

at least one substrate, wherein the at least one substrate defines a plurality of annular accommodating grooves, each annular accommodating groove divides a corresponding substrate into a central part surrounded by the each annular accommodating groove and a peripheral part arranged around the each annular accommodating groove, each central part defines a plurality of inner through holes therethrough, and each peripheral part defines a plurality of outer through holes therethrough; and a diameter of each of the plurality of inner through hole is about 1.5~ 3.1 mm;

a plurality of magnetic cores each accommodated in a respective one of the annular accommodating grooves;

a plurality of transmission wire layers, wherein on each of two opposite sides of the at least one substrate is arranged one of the transmission wire layers, each of the transmission wire layers comprises a plurality of conductive wire patterns spaced apart from each other and arranged along a circumferential direction of a corresponding one of the annular accommodating grooves, each of the conductive wire patterns bridges one of the inner through holes and one of the outer through holes; and a plurality of conductive connectors arranged in the inner through holes and the outer through holes, and configured to connect in order the conductive wire patterns on the two transmission wire layers on each of the at least one substrate to form a plurality of coil circuits capable of transmitting current around the magnetic core, wherein each of the plurality of coil circuits is located around a corresponding one of the plurality of magnetic cores;

wherein the central parts and the peripheral parts of the at least one substrate, the magnetic cores and the conductive connectors assembled on the at least one substrate, and the transmission wire layers on both sides of the at least one substrate cooperatively constitute a plurality of transformers and filters arranged according to preset arrangement manners, at least one of the transformers and at least one of the filters are electrically connected to form a group of electromagnetic assemblies, and any two groups of electromagnetic assemblies are not electrically connected with each other on the at least one substrate; and wherein the plurality of inner through holes comprise a plurality of first inner through holes and second inner through holes; a connecting line of centers of all the first inner through holes forms a first circular trajectory, and a connecting line of centers of all the second inner through holes forms a second circular trajectory; a center of the first circular trajectory and a center of the second circular trajectory coincides, a radius of the second circular trajectory is larger than a radius of the first circular trajectory, and distances between the center of each of the second inner through holes and the centers of two adjacent first inner through holes are equal;

the plurality of the outer through holes comprise a plurality of first outer through holes and second outer through holes; the plurality of conductive wire patterns of each of the transmission wire layers comprise a plurality of input lines and coupling lines; each of the input lines bridges one of the first inner through holes and one of the first outer through holes; and each of the coupling lines bridges one of the second inner through holes and one of the second outer through holes;

the input lines are divided into a plurality of input line groups, and the coupling lines are divided into a plurality of coupling line groups; each of the input line groups comprises at least one of the plurality of input lines, and each of the coupling line groups comprises at least one of the plurality of coupling lines;

each of the input line groups in the same one of the transmission wire layers comprises only one of the input lines, and each of the coupling line groups comprises only one of the coupling lines; in the same one of the transmission wire layers, each input line and each coupling line are alternately arranged along the circumferential direction of the magnetic cores.

13. The electronic device according to claim 12, wherein each group of electromagnetic assemblies comprises one transformer and one filter, and the one transformer is electrically connected with the one filter.

14. The electronic device according to claim 12, wherein each group of electromagnetic assemblies comprises two transformers and one filter, and the one filter is arranged between the two transformers, and the two transformers are electrically connected with the one filter.

15. The electronic device according to claim 12, wherein the at least one substrate comprises two substrates arranged along an axial direction of the inner through holes, and the electronic device further comprises:

a connecting layer located between the two substrates; and conductive holes extending through the two substrates and the connecting layer along the axial direction of the inner through holes and configured to electrically connect the two layers of the substrates.

16. The electronic device according to claim 12, wherein widths of at least some of the conductive wire patterns in the transformer are gradually increased along a wiring direction from the inner through holes to the outer through holes such that a distance between at least some of adjacent ones of the conductive wire patterns is consistent within a projection area of the corresponding one of the plurality of annular accommodating grooves.

17. The electronic device according to claim 1, wherein the plurality of the inner through holes are composed of a plurality of first inner through holes and second inner through holes, and the plurality of inner through holes are uniformly distributed on the central part, an annular accommodating groove is arranged at the center of the substrate to divide the substrate into the central part and the peripheral part, the central part and the peripheral part are an integrated structure; the at least one transformer and the at least one filter are arranged in a same layer.

18. The electronic device according to claim 1, wherein a thickness of each of the plurality of transmission wire layers are in a range of 17~102 μm.

19. The electronic device according to claim 18, wherein a thickness of each of the plurality of transmission wire layers are in a range of 17~34 μm.

20. The electronic device according to claim 18, wherein a thickness of each of the plurality of transmission wire layers are in a range of 65~80 μm.

* * * * *